(12) United States Patent  
Disch et al.

(10) Patent No.: US 12,051,431 B2  
(45) Date of Patent: Jul. 30, 2024

(54) AUDIO SIMILARITY EVALUATOR, AUDIO ENCODER, METHODS AND COMPUTER PROGRAM

(71) Applicant: Fraunhofer-Gesellschaft zur Förderung der angewandten Forschung e.V., Munich (DE)

(72) Inventors: Sascha Disch, Erlangen (DE); Steven Van De Par, Illmenau (DE); Andreas Niedermeier, Erlangen (DE); Elena Burdiel Pérez, Erlangen (DE); Bernd Edler, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 799 days.

(21) Appl. No.: 17/105,845

(22) Filed: Nov. 27, 2020

(65) Prior Publication Data

US 2021/0082447 A1 Mar. 18, 2021

Related U.S. Application Data

(63) Continuation of application No. PCT/EP2019/064105, filed on May 29, 2019.

(30) Foreign Application Priority Data

May 30, 2018 (EP) .................................... 18175251  
Oct. 5, 2018 (EP) .................................... 18198992

(51) Int. Cl.  
*G10L 19/09* (2013.01)  
*G10L 19/26* (2013.01)  
*G06N 5/04* (2023.01)

(52) U.S. Cl.  
CPC .............. *G10L 19/09* (2013.01); *G10L 19/26* (2013.01); *G06N 5/04* (2013.01)

(58) Field of Classification Search  
CPC ......... H04R 29/00; G10L 19/09; G10L 19/26; G10L 19/20; G10L 19/22; G10L 19/008;  
(Continued)

(56) References Cited

U.S. PATENT DOCUMENTS 5,878,387 A * 3/1999 Oshikiri .................. G10L 19/06  
704/E19.024  
6,842,733 B1 1/2005 Gao et al.  
(Continued)

FOREIGN PATENT DOCUMENTS

CN 101053018 A 10/2007  
CN 102859579 A 1/2013  
(Continued)

OTHER PUBLICATIONS

A. Kohlrausch et al.: "The influence of carrier level and frequency on modulation and beat detection thresholds for sinusoidal carriers," J. Acoust. Soc. Am., 108, pp. 723-734, 2000.  
(Continued)

*Primary Examiner* — Ahmad F. Matar  
*Assistant Examiner* — Sabrina Diaz  
(74) *Attorney, Agent, or Firm* — McClure, Qualey & Rodack, LLP

(57) ABSTRACT

An audio similarity evaluator obtains envelope signals for a plurality of frequency ranges on the basis of an input audio signal. The audio similarity evaluator is configured to obtain a modulation information associated with the envelope signals for a plurality of modulation frequency ranges, wherein the modulation information describes the modulation of the envelope signals. The audio similarity evaluator is configured to compare the obtained modulation informa- (Continued)

tion with a reference modulation information associated with a reference audio signal, in order to obtain an information about a similarity between the input audio signal and the reference audio signal. An audio encoder uses such an audio similarity evaluator. Another audio similarity evaluator uses a neural net trained using the audio similarity evaluator.

32 Claims, 20 Drawing Sheets
(2 of 20 Drawing Sheet(s) Filed in Color)

(58) Field of Classification Search
CPC ....... G10L 19/032; G10L 19/13; G10L 19/02; G10L 19/04; G10L 19/18; G10L 21/038; G06N 5/04; H04S 3/002
USPC .................................................... 381/56, 23
See application file for complete search history.

(56) References Cited

U.S. PATENT DOCUMENTS

| | | | |
|---|---|---|---|
| 2004/0068401 A1 | 4/2004 | Herre et al. | |
| 2007/0016411 A1 | 1/2007 | Kim et al. | |
| 2007/0083365 A1 | 4/2007 | Shmunk | |
| 2007/0198274 A1* | 8/2007 | Van De Par | G10L 19/24 704/E19.044 |
| 2008/0195398 A1 | 8/2008 | Lee et al. | |
| 2009/0138271 A1 | 5/2009 | Christensen et al. | |
| 2009/0265024 A1 | 10/2009 | Dittmar et al. | |
| 2012/0078640 A1 | 3/2012 | Shirakawa et al. | |
| 2013/0216053 A1 | 8/2013 | Disch | |
| 2013/0339010 A1* | 12/2013 | Kikuiri | G10L 19/02 704/203 |
| 2015/0170662 A1* | 6/2015 | Krishnan | G10L 19/02 704/205 |
| 2015/0287417 A1 | 10/2015 | Disch et al. | |
| 2015/0332702 A1 | 11/2015 | Disch et al. | |
| 2016/0247506 A1 | 8/2016 | LeComte et al. | |
| 2017/0345433 A1 | 11/2017 | Dittmar et al. | |
| 2019/0132688 A1* | 5/2019 | Boldt | H04R 25/505 |

FOREIGN PATENT DOCUMENTS

| | | | | |
|---|---|---|---|---|
| CN | 104485114 A | 4/2015 | | |
| CN | 107517593 A | 12/2017 | | |
| JP | H08-171400 A | 7/1996 | | |
| JP | 2002-082696 A | 3/2002 | | |
| JP | 2004-004530 A | 1/2004 | | |
| KR | 20070009340 A | 1/2007 | | |
| RU | 2 418 321 A | 11/2009 | | |
| RU | 2 641 461 A | 3/2017 | | |
| WO | WO-2007034375 A2 * | 3/2007 | ......... | G10L 19/0204 |

OTHER PUBLICATIONS

A. Kohlrausch et al.: "A New Perceptual Model for Audio Coding Based on Spectra-Temporal Masking"; AES Convention 124, May 17, 2008 (May 17, 2008), XP040508552.
S. Disch et al.: "Intelligent Gap Filling in Perceptual Transform Coding of Audio," in Audio Engineering Society Convention 141, 2016.
S. Disch et al.: "Audio Engineering Society Convention Paper 10029 Improved Psychoacoustic Model for Efficient Perceptual Audio Codecs" Oct. 18, 2018 (Oct. 18, 2018), XP055604008, Retrieved from the Internet: URL:http://www.aes.org/e-lib/inst/download.cfm/19755.pdf?ID=19755.
J. Herre et al.: "MPEG-4 high-efficiency AAC coding [Standards in a Nutshell]," Signal Processing Magazine, IEEE, (vol. 25, 2008), pp. 137-142, 2008.
J. Herre et al.: "Perceptual Audio Coding", pp. 757-799, Academic press, Elsevier Ltd., 2013.
J. Herre et al.: "MPEG-H Audio—The New Standard for Universal Spatial / 3D Audio Coding," 137th AES Convention, 2014.
G. Schuller et al.: "Low delay audio compression using predictive coding," in 2002 IEEE International Conference on Acoustics, Speech, and Signal Processing, vol. 2, pp. 1853-1856, 2002.
M. Dietz et al: "Spectral Band Replication, a Novel Approach in Audio Coding," in Audio Engineering Society Convention 112, 2002.
ISO/IEC (MPEG-H) 23008-3, "High efficiency coding and media delivery in heterogeneous environments—Part 3: 3D audio," 2015.
3GPP, TS 26.445, EVS Codec Detailed Algorithmic Description; 3GPP Technical Specification (Release 12), 2014.
ITU-R, Recommendation BS.1534-1 Method for subjective assessment of intermediate sound quality (MUSHRA), Geneva, 2003.
M.-V. Laitinen et al.: "Sensitivity of Human Hearing to Changes in Phase Spectrum," J. Audio Eng. Soc (Journal of the AES), (vol. 61, No. 11, 2013), pp. 860-877, 2013.
T. Dau: "Modeling auditory processing of amplitude modulation"; Ph.D. thesis, 1996.
T. Dau et al.: "A quantitative model of the 'effective' signal processing in the auditory system. I. Model structure," J. Acoust. Soc. Am., 99, pp. 3615-3622, 1996.
T. Dau et al.: "Modelling auditory processing of amplitude modulation. I. Detection and masking with narrow-band carriers," J. Acoust. Soc. Am., 102, pp. 2892-2905, 1997.
S. Ewert et al.: "Spectro-temporal processing in the envelope-frequency domain," J. Acoust. Soc. Am., (112), pp. 2921-2931, 2003.
B. Glasberg et al.: "Derivation of auditory filter shapes from notched-noise data," Hearing Research, (47), pp. 103-138, 1990.
https://commons.wikimedia.org/wiki/File:Cochlea_crosssection.svg, Jul. 2018.
R. Vafin et al.: "Improving modeling of audio signals by modifying transient locations," in Proceedings of the IEEE Workshop on Applications of Signal Processing to Audio and Acoustics, pp. 143-146, 2001.
S. Van De Par et al.: "Comparison of monaural (CMR) and binaural (BMLD) masking release," J. Acoust. Soc. Am., 103, pp. 1573-1579, 1998.
S. Van De Par et al.: "A new perceptual model for audio coding based on spectro-temporal masking," in 124th AES Convention, 2008.
J. Hall et al.: "Detection in noise by spectro-temporal pattern analysis," J. Acoust. Soc. Am., (76), pp. 50-56, 1984.
T. Hanna: "Discrimination of reproducible noise as a function of bandwidth and duration," Percept. Psychophys., 36, pp. 409-416, 1984.
K. Schmidt et al.: "Low complexity tonality control in the Intelligent Gap Filling tool," in 2016 IEEE International Conference on Acoustics, Speech and Signal Processing (ICASSP), pp. 644-648, 2016.
C. Helmrich et al.: "Spectral Envelope Reconstruction via IGF for Audio Transform Coding," in IEEE International Conference on Acoustics, Speech and Signal Processing (ICASSP), Brisbane, Australia, 2015.
International Search Report and Written Opinion, Oct. 10, 2019, from PCT/EP2019/064105.
IPRP and Annex, Sep. 23, 2020, from PCT/EP2019/064105.
Written Opinion, May 25, 2020, from PCT/EP2019/064105.
Russian language office action dated Jul. 28, 2021, issued in application No. RU 2020143350.
English language translation of office action dated Jul. 28, 2021, issued in application No. RU 2020143350.
CN Office Action dated Sep. 1, 2023 in Chinese application No. 201980049602.7.
Japanese language office action dated Mar. 22, 2022, issued in application No. JP 2020-567028.
English language translation of Japanese office action dated Mar. 22, 2022, issued in application No. JP 2020-567028 (pp. 1-5 of attachment).

(56) References Cited

OTHER PUBLICATIONS

Karheinz Brandenburg, et al. ISO/MPEG-1 audio: A generic standard for coding of high-quality digital audio, Journal of the Audio Engineering Society, Oct. 1994.
KR Office Action dated Jan. 3, 2023 in Korean application No. 10-2020-7037819.
Decision to Grant a Patent issued Nov. 21, 2023 in the parallel KR patent application No. 10-2020-7037819.
Chinese language Notice of Allowance dated Apr. 19, 2024, issued in application No. CN 201980049602.7.
English language translation of Notice of Allowance dated Apr. 19, 2024 (p. 1 of attachment).

* cited by examiner

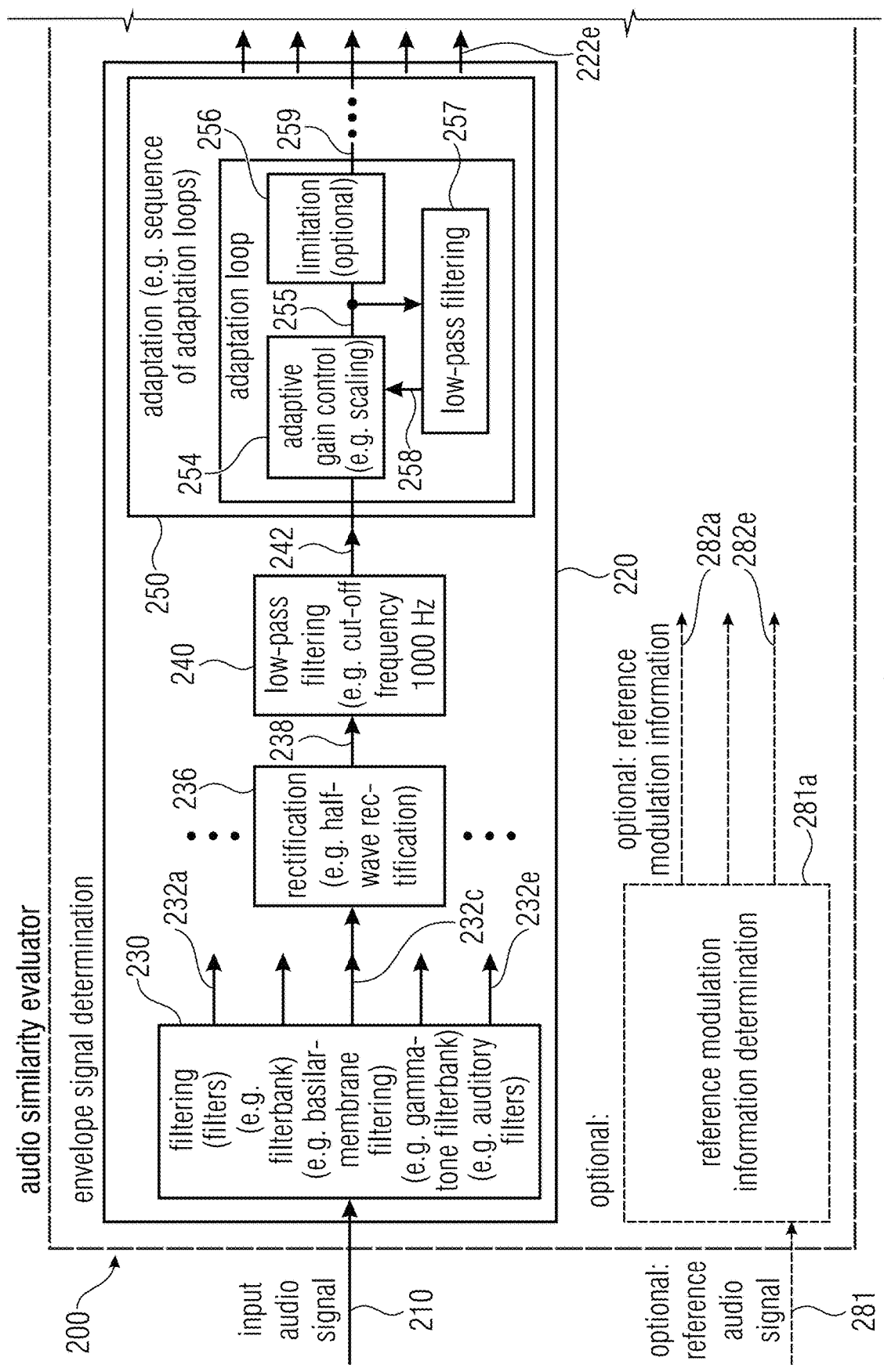
Fig. 2a (Part 1)

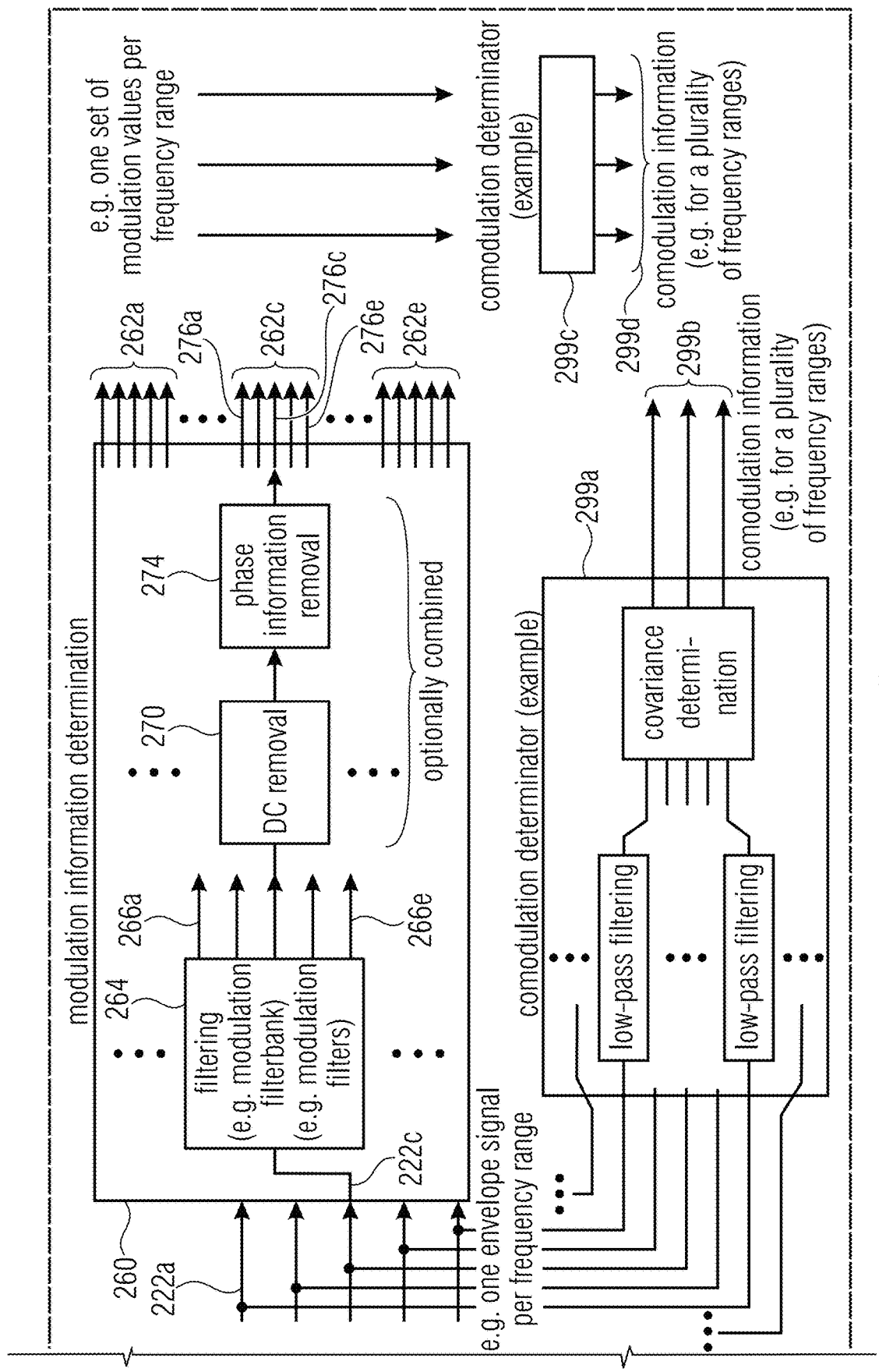
Fig. 2a (Part 2)

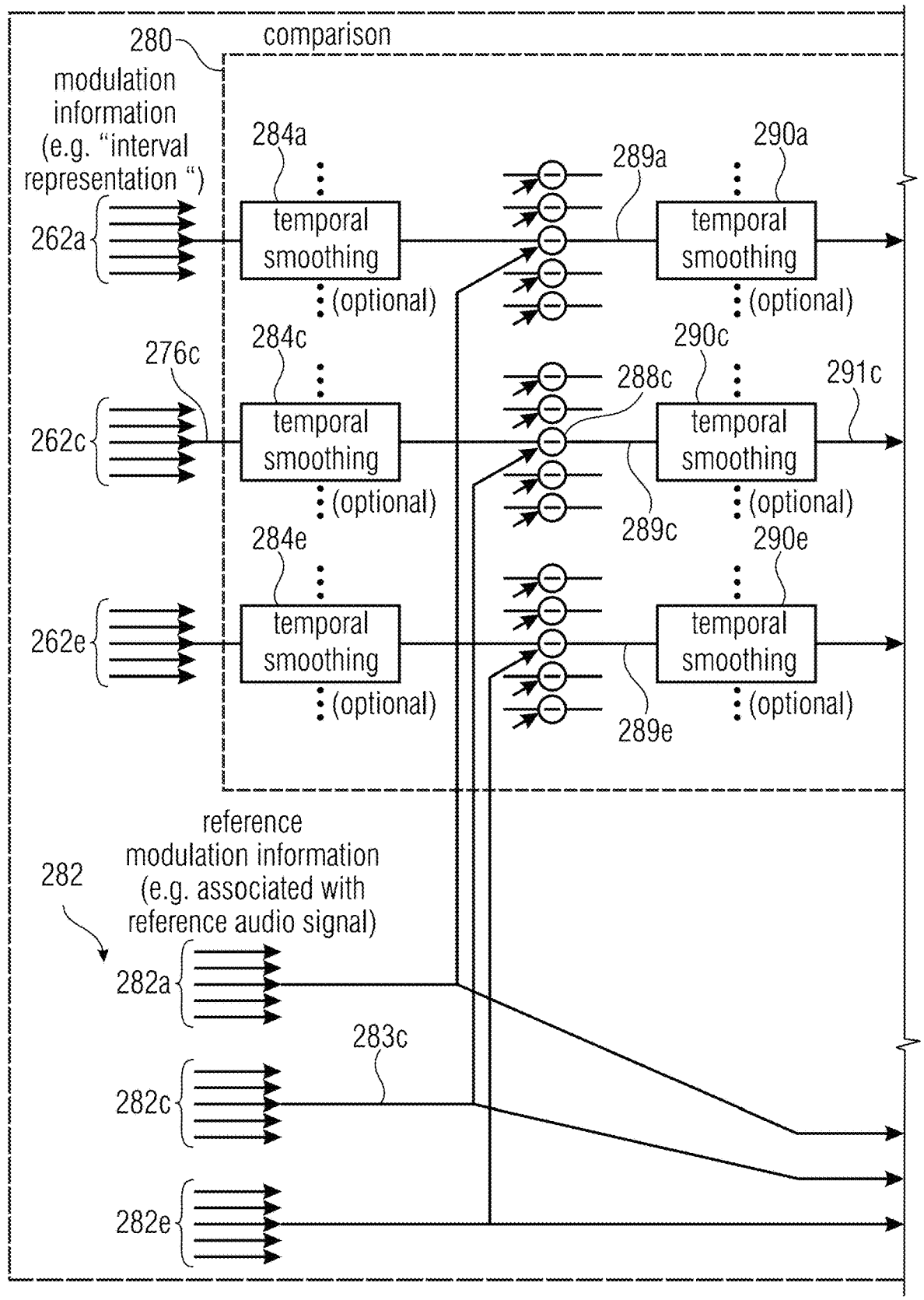
Fig. 2b (Part 1)

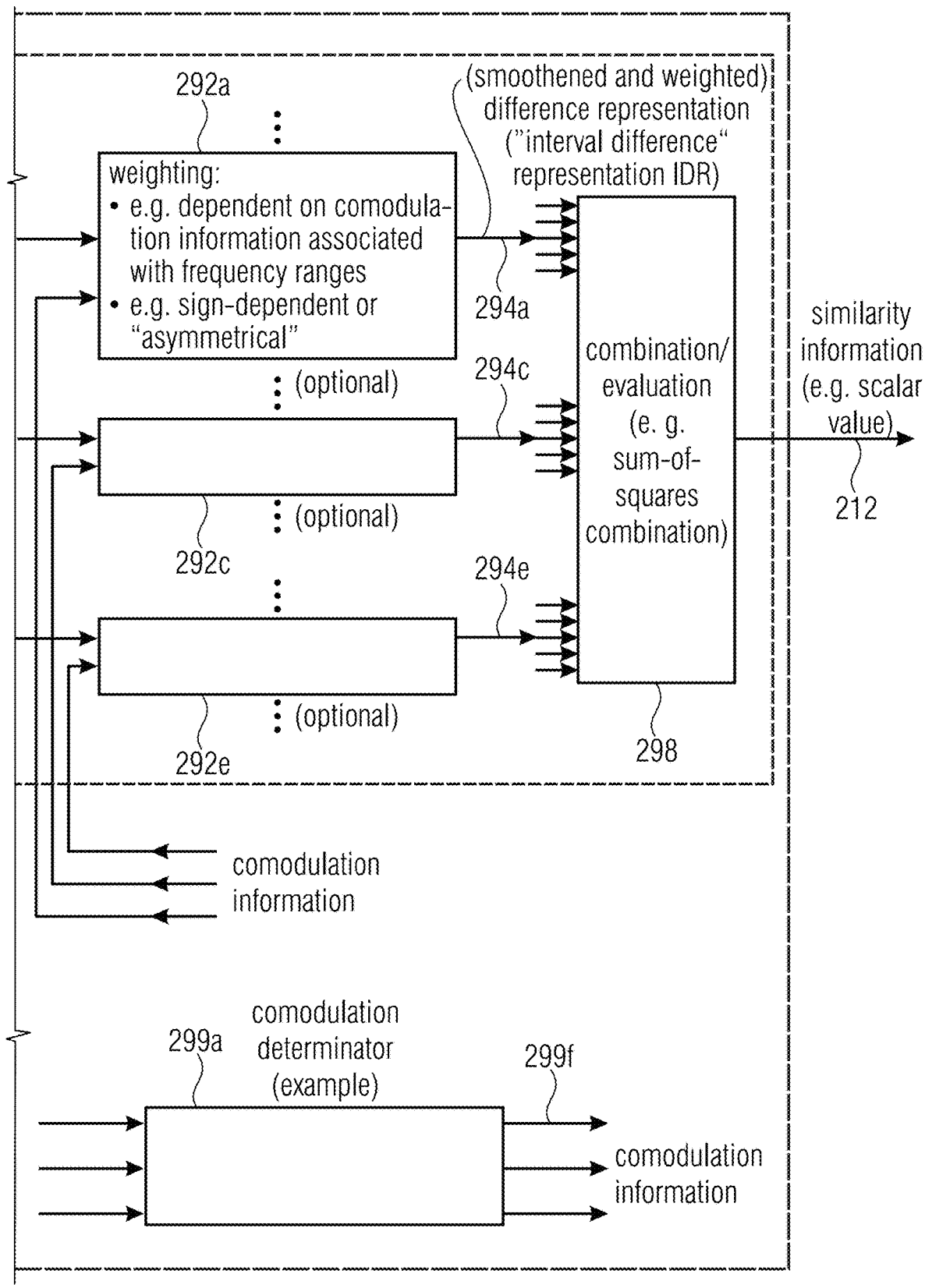
Fig. 2b (Part 2)

(SIGNAL FLOW AND OF PROCESSING BLOCKS OF THE DAU ET AL. AUDITORY PROCESSING MODEL)

GAMMA-TONE FILTERBANK IMPULSE RESPONSES
(THE GAMMA-TONE FILTERBANK CAN SERVE AS A
SIMPLIFIED MODEL OF THE BASILAR MEMBRANE)

ORGAN OF CORTI (MODIFIED FROM [14])

AUDIO DECODER USING IGF

IGF TILE SELECTION

GENERATION OF IGF AUTOMATED CHOICE ITEMS

| name | item | genre |
|---|---|---|
| A | dreadlock | reggae music, voice (10cc) |
| B | judas | violin solo |
| C | ocs08 | plugged strings solo |
| D | ocs11 | dance music (Madonna) |
| E | phi3 | pop music (Alan Parsons Project) |
| F | rock | distorted rock music |
| G | te09 | pop music, voice (Tracy Chapman) |
| H | te1 | german male speech |
| I | tk1 | Harpsichord solo |
| J | trilogy | jazz music |
| K | vega | A-capella voice (Suzanne Vega) |

FIG. 12A

TABLE 1: ITEMS OF LISTENING TEST

| number | name |
|---|---|
| 1 | original |
| 2 | 3.5 kHz anchor |
| 3 | 7.0 kHz anchor |
| 4 | fixed tiling, heuristic whitening |
| 5 | automated tiling and whitening |

FIG. 12B

TABLE 2: CONDITIONS OF LISTENING TEST

CHOICE OF IGF TILES FOR TRILOGY THROUGH AUTOMATED CONTROL. FOR EACH FRAME (CIRCLES), THE SOURCE TILE "sT" CHOICE [0,1,2,3] IS SHOWN FOR EACH OF THE THREE TARGET TILES AS A BLACK LINE OVERLAY ON THE SPECTROGRAM

CHOICE OF IGF WHITENING LEVELS FOR TRILOGY THROUGH AUTOMATED CONTROL. FOR EACH FRAME (CIRCLES), THE WHITENING LEVEL CHOICE [0,1,2] IS SHOWN FOR EACH OF THE THREE TARGET TILES AS A BLACK LINE OVERLAY ON THE SPECTROGRAM

ABSOLUTE MUSHRA SCORES OF PROPOSED AUTOMATED AND FIXED IGF CONTROL

DIFFERENCE MUSHRA SCORES COMPARING PROPOSED AUTOMATED AGAINST FIXED IGF CONTROL

AUDIO SIMILARITY EVALUATOR, AUDIO ENCODER, METHODS AND COMPUTER PROGRAM

CROSS-REFERENCE TO RELATED APPLICATIONS

This application is a continuation of copending International Application No. PCT/EP2019/064105, filed May 29, 2019, which is incorporated herein by reference in its entirety, and additionally claims priority from European Applications Nos. 18175251.0, filed May 30, 2018, and 18198992.2, filed Oct. 5, 2018, all of which are incorporated herein by reference in their entirety.

BACKGROUND OF THE INVENTION

15 Embodiments according to the invention are related to audio similarity evaluators.

Further embodiments according to the invention are related to audio encoders.

Further embodiments according to the invention are related to methods for evaluating a similarity between audio signals.

Further embodiments according to the invention are related to methods for encoding an audio signal.

Further embodiments according to the invention are related to a computer program for performing said methods.

Generally, embodiments according to the invention are related to an improved psycho-acoustic model for efficient perceptual audio codecs.

Audio coding is an emerging technical field, since the encoding and decoding of audio contents is important in many technical fields, like mobile communication, audio streaming, audio broadcast, television, etc.

In the following, an introduction to perceptual coding will be provided. It should be noted that the definitions and details discussed in the following can optionally be applied in conjunction with the embodiments disclosed herein.

Perceptual Codecs

Perceptual audio codecs like mp3 or AAC are widely used to code the audio in today's multimedia applications [1]. Most popular codecs are so-called waveform coders, that is, they preserve the audio's time domain waveform and mostly add (inaudible) noise to it due to perceptually controlled application of quantisation. Quantisation may typically happen in a time-frequency domain, but can also be applied in time domain [2]. To render the added noise inaudible, it is shaped under control of a psychoacoustic model, typical a perceptual masking model.

In today's audio applications, there is a constant request for lower bitrates. Perceptual audio codecs traditionally limit audio bandwidth to still achieve decent perceptual quality at these low bitrates. Efficient semi-parametric techniques like Spectral Bandwidth Replication (SBR) [3] in High Efficiency Advanced Audio Coding (HE-AAC) [4] or Intelligent Gap Filling (IGF) [5] in MPEG-H 3D Audio [6] and 3gpp Enhanced Voice Services (EVS) [7] are used for extending the bandlimited audio up to full bandwidth at decoder side. Such technique is called Bandwidth Extension (BWE). These techniques insert an estimate of the missing high frequency content controlled by a few parameters. Typically, the most important BWE side information is envelope related data. Usually, the estimation process is steered by heuristics rather than a psychoacoustic model.

Perceptual Models

Psychoacoustic models used in audio coding mainly rely on evaluating whether the error signal is perceptually masked by the original audio signal to be encoded. This approach works well when the error signal is caused by a quantisation process typically used in waveform encoders. For parametric signal representations, however, such as SBR or IGF, the error signal will be large even when artefacts are hardly audible.

This is a consequence of the fact that the human auditory system does not process the exact waveform of an audio signal; in certain situations the auditory system is phase insensitive and the temporal envelope of a spectral band becomes the main auditory information that is evaluated. For example, different starting phases of a sinusoid (with smooth onset and offsets) have no perceivable effect. For a harmonic complex tone, however, relative starting phases can be perceptually important, specifically when multiple harmonics fall within one auditory critical band [8]. The relative phases of these harmonics, as well as their amplitudes, will influence the temporal envelope shape that is represented within one auditory critical band which, in principle can be processed by the human auditory system.

In view of this situation, there is a need for a concept to compare audio signals and/or to decide about coding parameters which provides an improved tradeoff between computational complexity and perceptual relevance and/or which allows for the first time to use parametric techniques under control of a psychoacoustic model.

SUMMARY

An embodiment may have an audio similarity evaluator, wherein the audio similarity evaluator is configured to obtain envelope signals for a plurality of frequency ranges on the basis of an input audio signal, and wherein the audio similarity evaluator is configured to obtain a modulation information associated with the envelope signals for a plurality of modulation frequency ranges, wherein the modulation information describes the temporal modulation of the envelope signals for a plurality of modulation frequency ranges and has a plurality of values which are associated with different modulation frequencies that are present in a respective envelope signal; and wherein the audio similarity evaluator is configured to compare the obtained modulation information with a reference modulation information associated with a reference audio signal, in order to obtain an information about a similarity between the input audio signal and the reference audio signal.

Another embodiment may have an audio encoder for encoding an audio signal, wherein the audio encoder is configured to determine one or more coding parameters in dependence on an evaluation of a similarity between an audio signal to be encoded and an encoded audio signal, herein the audio encoder has an inventive audio similarity evaluator as mentioned before, which is configured to evaluate the similarity between the audio signal to be encoded and the encoded audio signal.

Another embodiment may have an audio encoder for encoding an audio signal, wherein the audio encoder is configured to determine one or more coding parameters in dependence on an audio signal to be encoded using a neural network, wherein the neural network is trained using an inventive audio similarity evaluator as mentioned before.

Another embodiment may have an audio similarity evaluator, wherein the audio similarity evaluator is configured to obtain envelope signals for a plurality of frequency ranges on the basis of an input audio signal, and wherein the audio similarity evaluator is configured to compare an analysis representation of the input audio signal, which corresponds to the envelope signals or which is based on the envelope signals, with a reference analysis representation associated with a reference audio signal, in order to obtain an information about a similarity between the input audio signal and the reference audio signal, wherein audio similarity evaluator is configured to adjust a weighting of a difference between the obtained analysis representation and the reference analysis representation in dependence on a comodulation between the envelope signals or an obtained modulation information in two or more adjacent acoustic frequency ranges of the input audio signal or in dependence on a comodulation between envelope signals associated with the reference audio signal or between reference modulation information in two or more adjacent acoustic frequency ranges of the reference audio signal.

Another embodiment may have a method for evaluating a similarity between audio signals, wherein the method has obtaining envelope signals for a plurality of frequency ranges on the basis of an input audio signal, and wherein the method has obtaining a modulation information associated with the envelope signals for a plurality of modulation frequency ranges, wherein the modulation information describes the temporal modulation of the envelope signals for a plurality of modulation frequency ranges and has a plurality of values which are associated with different modulation frequencies that are present in a respective envelope signal; and wherein the method has comparing the obtained modulation information with a reference modulation information associated with a reference audio signal, in order to obtain an information about a similarity between the input audio signal and the reference audio signal.

Still another embodiment may have a method for encoding an audio signal, wherein the method has determining one or more coding parameters in dependence on an evaluation of a similarity between an audio signal to be encoded and an encoded audio signal, wherein the method has evaluating the similarity between the audio signal to be encoded and the encoded audio signal according to the inventive method for evaluating as mentioned before.

Another embodiment may have a method for encoding an audio signal, wherein the method has determining one or more coding parameters in dependence on an audio signal to be encoded using a neural network, wherein the neural network is trained using the inventive method for evaluating a similarity between audio signals as mentioned before.

Another embodiment may have a method for evaluating a similarity between audio signals, wherein the method has obtaining envelope signals for a plurality of frequency ranges on the basis of an input audio signal, and wherein the method has comparing an analysis representation of the input audio signal, which corresponds to the envelope signals or which is based on the envelope signals, with a reference analysis representation associated with a reference audio signal, in order to obtain an information about a similarity between the input audio signal and the reference audio signal, wherein the method has adjusting a weighting of a difference between the obtained analysis representation and the reference analysis representation in dependence on a comodulation between the envelope signals or an obtained modulation information in two or more adjacent acoustic frequency ranges of the input audio signal or in dependence on a comodulation between envelope signals associated with the reference audio signal or between reference modulation information in two or more adjacent acoustic frequency ranges of the reference audio signal.

Another embodiment may have a non-transitory digital storage medium having stored thereon a computer program for performing the inventive methods of evaluating a similarity and of encoding as mentioned before, when said computer program is run by a computer.

The audio similarity evaluator is configured to obtain envelope signals for a plurality of (advantageously overlapping) frequency ranges (for example, using a filterbank or a Gammatone filterbank and a rectification and a temporal low pass filtering and one or more adaptation processes which may, for example, model a pre-masking and/or a post-masking in an auditory system) on the basis of an input audio signal (for example, to perform an envelope demodulation in spectral sub-bands).

The audio similarity evaluator is configured to obtain a modulation information (for example, output signals of the modulation filters) associated with the envelope signals for a plurality of modulation frequency ranges (for example, using a modulation filterbank or using modulation filters), wherein the modulation information describes (for example, in the form of output signals of the modulation filterbank or in the form of output signals of the modulation filters) the modulation of the envelope signals (and may, for example, be considered as an internal representation) For example, the audio similarity evaluator may be configured to perform an envelope modulation analysis.

The audio similarity evaluator is configured to compare the obtained modulation information (for example, an internal representation) with a reference modulation information associated with a reference audio signal (for example, using an internal difference representation, wherein the internal difference representation may, for example describe a difference between the obtained modulation information and the reference modulation information, wherein one or more weighting operations or modification operations may be applied, like a scaling of the internal difference representation based on a degree of co-modulation or an asymmetrical weighting of positive and negative values of the internal difference representation), in order to obtain an information about a similarity between the input audio signal and the reference audio signal (for example, a single value describing a perceptual similarity between the input audio signal and the reference audio signal).

This embodiment according to the invention is based on the finding that a modulation information, which is associated with envelope signals for a plurality of modulation frequency ranges, can be obtained with moderate effort (for example, using a first filterbank to obtain the envelope signals and using a second filterbank, which may be a modulation filterbank, to obtain the modulation information, wherein some minor additional processing steps will also be used to improve accuracy).

Moreover, it has been found that such a modulation information is well-adapted to the human hearing impression in many situations, which means that a similarity of the modulation information corresponds to a similar perception of an audio content, while a major difference is of the modulation information typically indicates that an audio content will be perceived as being different. Thus, by comparing the modulation information of an input audio signal with the modulation information associated with a reference audio signal, it can be concluded whether the input audio signal will be perceived as being similar to the audio content of the reference audio signal or not. In other words, a quantitative measure which represents the similarity or difference between the modulation information associated with the input audio signal and the modulation information associated with the reference audio signal can serve as a (quantitative) similarity information, representing the similarity between the audio content of the input audio signal and the audio content of the reference audio signal in a perceptually-weighted manner.

Thus, the similarity information obtained by the audio similarity evaluator (for example, a single scalar value associated with a certain passage (for example, a frame) of the input audio signal (and/or of the reference audio signal) is well-suited to determine (for example, in a quantitative manner) how much the "input audio signal" is perceptually degraded with respect to the reference audio signal (for example, if it is assumed that the input audio signal is a degraded version of the reference audio signal).

It has been found that this similarity measure may, for example, be used for determining the quality of a lossy audio encoding and, in particular, of a lossy non-waveform-preserving audio encoding. For example, the similarity information indicates a comparatively big deviation if the "modulation" (of the envelope signal) in one or more frequency ranges is changed significantly, which would typically result in a degraded hearing impression. On the other hand, the similarity information provided by the similarity evaluator would typically indicate a comparatively high similarity (or, equivalently, a comparatively small difference or deviation) if the modulation in different frequency bands is similar in the input audio signal and in the reference audio signal, even if the actual signal waveforms are substantially different. Thus, an outcome is in agreement with the finding that a human listener is typically not particularly sensitive to the actual waveform, but more sensitive with respect to modulation characteristics of an audio content in different frequency bands.

To conclude, the similarity evaluator described here provides a similarity information which is well-adapted to the human hearing impression.

In an embodiment, the audio similarity evaluator is configured to apply a plurality of filters or filtering operations (for example, of a filterbank or of a Gammatone filterbank) having overlapping filter characteristics (e.g. overlapping passbands), in order to obtain the envelope signals (wherein, advantageously, bandwidths of the filters or filtering operations are increasing with increasing center frequencies of the filters). For example, the different envelope signals may be associated with different acoustic frequency ranges of the input audio signal.

This embodiment is based on the finding that the envelope signals can be obtained with moderate effort using filters or filtering operations having overlapping filter characteristics, because this is well in agreement with the human auditory system. Furthermore, it has been found that it is advantageous to increase the bandwidth of the filters or filtering operations with increasing frequency, because this is well in agreement with the human auditory system and furthermore helps to keep the number of filters reasonably small while providing a good frequency resolution in the perceptually important low frequency region. Accordingly, the different envelope signals are typically associated with different acoustic frequency ranges of the input audio signal, which helps to obtain an accurate similarity information having a reasonable frequency resolution. For example, different signal degradation (for example, of the input audio signal with respect to the reference audio signal) in different frequency ranges can be considered in this manner.

In an embodiment, the audio similarity evaluator is configured to apply a rectification (e.g. a half wave rectification) to output signals of the filters or filtering operation, to obtain a plurality of rectified signals (for example, to model inner hair cells).

By applying a rectification to the output signals of the filters or of the filtering operation, it is possible to assimilate a behavior of inner hair cells. Furthermore, the rectification in combination with a low-pass filter provides for envelope signals which reflect intensities in different frequency ranges. Also, due to the rectification (and possibly a low-pass filtering), a number representation is comparatively easy (for example, since only positive values need to be represented). Moreover, the phenomenon of phase locking and the loss thereof for higher frequencies is modeled by said processing.

In an embodiment, the audio similarity evaluator is configured to apply a low-pass filter or a low-pass filtering (for example, having a cut-off frequency which is smaller than 2500 Hz or which is smaller than 1500 Hz) to the half-wave rectified signals (for example, to model inner hair cells).

By using a low-pass filter or a low-pass filtering (which may, for example, be applied separately to each envelope signal out of a plurality of envelope signals associated with different frequency ranges), an inertness of inner hair cells may be modeled. Furthermore, an amount of data samples is reduced by performing a low-pass filtering, and a further processing of the low-pass filtered (advantageously rectified) bandpass signals is facilitated. Thus, the advantageously rectified and low-pass filtered output signal of a plurality of filters or filtering operations may serve as the envelope signals.

In an embodiment, the audio similarity evaluator is configured to apply an automatic gain control, in order to obtain the envelope signals.

By applying an automatic gain control in order to obtain the envelope signals, a dynamic range of the envelope signals may be limited, which reduces numeric problems. Furthermore, it has been found that the usage of an automatic gain control, which uses certain time constants for the adaptation of the gain, models masking effects that occur in a hearing system, such that a similarity of information obtained by the audio similarity evaluator reflects a human hearing impression.

In an embodiment, the audio similarity evaluator is configured to vary a gain applied to derive the envelope signals on the basis of rectified and low-pass filtered signals provided by a plurality of filters or filter operations on the basis of the input audio signal.

It has been found that varying a gain, which is applied to derive the envelope signals on the basis of rectified and low-pass filtered signals provided by a plurality of filters or filter operations (on the basis of the input audio signal) is an efficient means for implementing an automatic gain control. It has been found that the automatic gain control can easily be implemented after the rectification and low-pass filtering of signals provided by a plurality of filters or filter operations. In other words, the automatic gain control is applied individually per frequency range, and it has been found that such a behavior is well in agreement with the human auditory system.

In an embodiment, the audio similarity evaluator is configured to process rectified and low-pass filtered versions of signals provided by a plurality of filters or filtering operations (e.g. provided by the Gammatone filterbank) on the basis of the input audio signal using a series of two or more adaptation loops (advantageously five adaptation loops), which apply a time-variant scaling in dependence on time variant gain values (for example, to effect a multi-stage automatic gain control, wherein the gain value is set to a comparatively small value for a comparatively large input signal or output signal of a respective stage, and wherein a gain value is set to a comparatively larger value for a comparatively smaller input value or output value of the respective stage). Optionally, there is a limitation of one or more output signals, for example to limit or avoid overshoots, e.g. a "Limiter".

The audio similarity evaluator is configured to adjust different time variant gain values (which are associated with different stages within the series of adaptation loops) using different time constants (for example, to model a pre-masking at an onset of an audio signal and/or to model a post-masking after an offset of an audio signal).

It has been recognized that the usage of a series of two or more adaptation loops which apply a time-variant scaling in dependence on time-variant gain values is well-adapted to model different time constants which occur in the human auditory system. When adjusting the different time variant gain values, which are used in different of the cascaded adaptation loops, different time constants of pre-masking and post-masking can be considered. Also, additional adaptation masking processes, which occur in the human auditory system, can be modeled in such a manner with moderate computational effort. For example, the different time constants, which are used to adjust different of the time variant gain values, may be adapted to different time constants accordingly in a human auditory system.

To conclude using a series (or a cascade) of two or more adaptation loops, which apply a time-variant scaling in dependence on time-variant scale values provides envelope signals which are well-suited for the purpose to obtain a similarity information describing a similarity between an input audio signal and a reference audio signal.

In an embodiment, the audio similarity evaluator is configured to apply a plurality of modulation filters (for example, of a modulation filterbank) having different (but possibly overlapping) passbands to the envelope signals (for example, such that components of the envelope signals having different modulation frequencies are at least partially separated), to obtain the modulation information (wherein, for example, a plurality of modulation filters associated with different modulation frequency ranges are applied to a first envelope signal associated with a first acoustic frequency range wherein, for example, a plurality of modulation filters associated with the different modulation frequency ranges are applied to a second envelope signal associated with a second acoustic frequency range which is different from the first acoustic frequency range).

It has been found that a meaningful information representing a modulation of envelope signals (associated with different frequency ranges) can be obtained with little effort using modulation filters which filter the envelope signals. For example, applying a set of modulation filters having different passbands to one of the envelope signals results in a set of signals (or values) for the given envelope signal (or associated with the given envelope signal, or associated with a frequency range of the input audio signal). Thus, a plurality of modulation signals may be obtained on the basis of a single envelope signal, and different sets of modulation signals may be obtained on the basis of a plurality of envelope signals.

Each of the modulation signals may be associated with a modulation frequency or a range of modulation frequencies. Consequently, the modulation signals (which may be output by the modulation filters) or, more precisely, an intensity thereof may describe how an envelope signal (associated with a certain frequency range) is modulated (for example, time-modulated). Thus, separate sets of modulation signals may be obtained for the different envelope signals.

These modulation signals may be used to obtain the modulation information, wherein different post-processing operations may be used to derive the modulation information (which is compared with the modulation information associated with the reference audio signal) from the modulation signals provided by the modulation filters.

To conclude, it has been found that the usage of a plurality of modulation filters is a simple-to-implement approach which can be used in the derivation of the modulation gain for information.

In an embodiment, the modulation filters are configured to at least partially separate components of the envelope signal having different frequencies (e.g. different modulation frequencies), wherein a center frequency of a first, lowest frequency modulation filter is smaller than 5 Hz, and wherein a center frequency of a highest frequency modulation filter is in a range between 200 Hz and 300 Hz.

It has been found that using such center frequencies of the modulation filters covers a range of modulation frequencies which is most relevant for the human perception.

In an embodiment, the audio similarity evaluator is configured to remove DC components when obtaining the modulation information (for example, by low-pass filtering output signals of the modulation filters, for example, with a cut-off frequency of half a center frequency of the respective modulation filter, and by subtracting signals resulting from the low-pass filtering from the output signals of the modulation filters).

It has been found that a removal of DC components when obtaining the modulation information helps to avoid a degradation of the modulation information by strong DC components which are typically included in the envelope signals. Also, by using a DC removal when obtaining the modulation information on the basis of the envelope signals, a steepness of modulation filters can be kept reasonably small, which facilitates the implementation of the modulation filters.

In an embodiment, the audio similarity evaluator is configured to remove a phase information when obtaining the modulation information.

By removing a phase information, it is possible to neglect such information, which is typically not of particularly high relevance for a human listener under many circumstances, in the comparison of the modulation information associated with the input audio signal with the modulation information associated with the reference audio signal. It has been found that the phase information of the output signals of the modulation filters would typically degrade the comparison result, in particular if non-waveform-preserving modification (like, for example, a non-waveform-preserving encoding and decoding operation) is applied to the input audio signal. Thus, it is avoided to classify an input audio signal and a reference audio signal as having a small level of similarity, even though a human perception would classify the signals as being very similar.

In an embodiment, the audio similarity evaluator is configured to derive a scalar value representing a difference between the obtained modulation information (for example, an internal representation) and the reference modulation information associated with a reference audio signal (for example, a value representing a sum of squared differences between the obtained modulation information, which may comprise sample values for a plurality of acoustic frequency ranges and for a plurality of modulation frequency ranges per acoustic frequency range, and the reference modulation information, which may also comprise sample values for a plurality of acoustic frequency ranges and for a plurality of modulation frequency ranges per acoustic frequency range).

It has been found that a (single) scalar value may well represent differences between the modulation information associated with the input audio signal and modulation information associated with the reference audio signal. For example, the modulation information may comprise individual signals or values for different modulation frequencies and for a plurality of frequency ranges. By combining differences between all these signals or values into a single scalar value (which may take the form of a "distance measure" or a "norm"), it is possible to have a compact and meaningful assessment of the similarity between the input audio signal and the reference audio signal. Also, such a single scalar value may easily be usable by a mechanism for selecting coding parameters (for example encoding parameters and/or decoding parameters), or for deciding about any other audio signal processing parameters which may be applied for a processing of the input audio signal.

It has been found that the determination of a difference representation may be an efficient intermediate step for deriving the similarity information. For example, the difference representation may represent differences between different modulation frequency bins (wherein, for example, a separate set of modulation frequency bins may be associated with different envelope signals being associated with different frequency ranges) when comparing the input audio signal with the reference audio signal.

For example, the difference representation may be a vector, wherein each entry of the vector may be associated with a modulation frequency and with a frequency range (of the input audio signal or of the reference audio signal) under consideration. Such a difference representation is well-suited for a post-processing, and also allows for a simple derivation of a single scalar value representing the similarity information.

In an embodiment, the audio similarity evaluator is configured to determine a difference representation (for example, IDR) in order to compare the obtained modulation information (for example, an internal representation) with the reference modulation information associated with a reference audio signal.

In an embodiment, the audio similarity evaluator is configured to adjust a weighting of a difference between the obtained modulation information (for example, an internal representation) and the reference modulation information associated with a reference audio signal in dependence on a comodulation between the obtained envelope signals or modulation information in two or more adjacent acoustic frequency ranges or between envelope signals associated with the reference signal or between the reference modulation information in two or more adjacent acoustic frequency ranges (wherein, for example, an increased weight is given to the difference between the obtained modulation information and the reference modulation information in case that a comparatively high degree of comodulation is found when compared to a case in which a comparatively low degree of comodulation is found) (and wherein the degree of comodulation is, for example, found by determining a covariance between temporal envelopes associated with different acoustic frequency ranges).

It has been found that adjusting the weighting of the difference between the obtained modulation information and the reference modulation information (which may, for example, be represented by the "difference representation") in dependence on the comodulation information is advantageous because differences between the modulation information may be perceived as stronger by a human listener if there is a comodulation in adjacent frequency ranges. For example, by associating an increased weight to the difference between the obtained modulation information and the reference modulation information in the case that a comparatively high degree of comodulation is found when compared to a case in which a comparatively low degree or amount of comodulation is found, the determination of the similarity information can be adapted to characteristics of the human auditory system. Consequently, the quality of the similarity information can be improved.

In an embodiment, the audio similarity evaluator is configured to put a higher weighting on differences between the obtained modulation information (for example, an internal representation) and the reference modulation information associated with a reference audio signal indicating that the input audio signal comprises an additional signal component when compared to differences between the obtained modulation information (for example, an internal representation) and the reference modulation information associated with a reference audio signal indicating that the input audio signal lacks a signal component when determining the information about the similarity between the input audio signal and the reference audio signal (for example, a single scalar value describing the information about the similarity).

Putting higher weighting on differences between the obtained modulation information and the reference modulation information associated with a reference signal indicating that the audio signal comprises an additional signal component (when compared to differences indicating that the input audio signal lacks a signal component) emphasizes a contribution of added signals (or signal components, or carriers) when determining an information about the difference between the input audio signal and the reference audio signal. It has been found that added signals (or signal components or a carriers) are typically perceived as being more distorting when compared to missing signals (or signal components or carriers). This fact can be considered by such an "asymmetric" weighting of positive and negative differences between the modulation information associated with the input audio signal and the modulation information associated with the reference audio signal. A similarity information can be adapted to the characteristics of the human auditory system in this manner.

In an embodiment, the audio similarity evaluator is configured to weight positive and negative values of a difference between the obtained modulation information and the reference modulation information (which typically comprises a large number of values) using different weights when determining the information about the similarity between the input audio signal and the reference audio signal.

By applying different weights to positive and negative values of the difference between the obtained modulation information and the reference modulation information (or, more precisely, between entries of a vector as mentioned above), the different impact of added and missing signals or signal components or carriers can be considered with very small computational effort.

Another embodiment according to the invention creates an audio encoder for encoding an audio signal. The audio encoder is configured to determine one or more coding parameters (for example, encoding parameters or decoding parameters, which are advantageously signaled to an audio decoder by the audio encoder) in dependence on an evaluation of a similarity between an audio signal to be encoded and an encoded audio signal. The audio encoder is configured to evaluate the similarity between the audio signal to be encoded and the encoded audio signal (for example, a decoded version thereof) using an audio similarity evaluator as discussed herein (wherein the audio signal to be encoded is used as the reference audio signal and wherein a decoded version of an audio signal encoded using one or more candidate parameters is used as the input audio signal for the audio similarity evaluator).

This audio encoder is based on the finding that the above mentioned determination of the similarity information is well-suited for an assessment of a hearing impression obtainable by an audio encoding. For example, by obtaining the similarity information using an audio signal to be encoded as a reference signal and using an encoded and subsequently decoded version of the audio signal to be encoded as the input audio signal for the determination of the similarity information, it can be evaluated whether the encoding and decoding process is suited to reconstruct the audio signal to be encoded with little perceptual losses. However, the above mentioned determination of the similarity information focuses on the hearing impression which can be achieved, rather than on an agreement of waveforms. Accordingly, it can be found out, using the similarity information obtained, which coding parameters (out of a certain choice of coding parameters) provides a best (or at least sufficiently good) hearing impression. Thus, the above mentioned determination of the similarity information can be used to make a decision about the coding parameter without requiring identity (or similarity) of waveforms.

Accordingly, the coding parameters can be chosen reliably, while avoiding impractical restrictions (like waveform-similarity).

In an embodiment, the audio encoder is configured to encode one or more bandwidth extension parameters which define a processing rule to be used at the side of an audio decoder to derive a missing audio content (for example, a high frequency content, which is not encoded in a waveform-preserving manner by the audio encoder) on the basis of an audio content of a different frequency range encoded by the audio encoder (e.g. the audio encoder is a parametric or semi-parametric audio encoder).

It has been found that the above-mentioned determination of the similarity information is well-suited for the selection of bandwidth extension parameters. It should be noted that parametric bandwidth extension, which are bandwidth extension parameters, is typically not waveform-preserving. Also, it has been found that the above mentioned determination of the similarity of audio signals is very well-suited for assessing similarities or differences in a higher audio frequency range, in which the bandwidth extension is typically active, and in which the human auditory system is typically insensitive to phase. Thus, the concept allows to judge bandwidth extension concepts, which may, for example, derive high-frequency components on the basis of low-frequency components, in an efficient and perceptually accurate manner.

In an embodiment, the audio encoder is configured to use an intelligent Gap Filling (for example, as defined in the MPEG-H 3D Audio standard, for example, in the version available on the filing date of the present application, or in modifications thereof), and the audio encoder is configured to determine one or more parameters of the intelligent Gap Filling using an evaluation of the similarity between the audio signal to be encoded and the encoded audio signal (wherein, for example, the audio signal to be encoded is used as the reference audio signal and wherein, for example, a decoded version of an audio signal encoded using one or more candidate intelligent gap filling parameters is used as the input audio signal for the audio similarity evaluation).

It has been found that the above-mentioned concept for the evaluation of similarities between audio signals is well-suited for usage in the context of an "intelligent gap filling", because the determination of the similarity between audio signals considers criteria, which are highly important for the hearing impression.

In an embodiment, the audio encoder is configured to select one or more associations between a source frequency range and a target frequency range for a bandwidth extension (for example, an association which determines on the basis of which source frequency range out of a plurality of selectable source frequency ranges an audio content of a target frequency range should be determined) and/or one or more processing operation parameters for a bandwidth extension (which may, for example determine parameters of a processing operation, like a whitening operation or a random noise replacement, which is executed when providing an audio content of a target frequency range on the basis of a source frequency range, and/or an adaptation of tonal properties and/or an adaptation of a spectral envelope) in dependence on the evaluation of a similarity between an audio signal to be encoded and an encoded audio signal.

It has been found that the selection of one or more associations between a source frequency range and a target frequency range and/or the selection of one or more processing operation parameters for a bandwidth extension may be performed with good results using the above mentioned approach for the evaluation of a similarity between audio signals. By comparing an "original" audio signal to be encoded with an encoded and decoded version (encoded and decoded again using a specific association and/or a specific processing between a source frequency range and a target frequency range, or between source frequency ranges and target frequency ranges), it can be judged whether the specific association provides a hearing impression similar to the original or not.

The same also holds for the choice of other processing operation parameters. Thus, by checking, for different settings of the audio encoding (and of the audio decoding) how good the encoded and decoded audio signal agrees with the (original) input audio signal, it can be found out which specific association (between a source frequency range and a target frequency range, or between source frequency ranges and target frequency ranges) provides the best similarity (or at least a sufficiently good similarity) when comparing the encoded and decoded version of the audio content with the original version of the audio content. Thus, adequate encoding settings (for example, an adequate association between a source frequency range and a target frequency range) can be chosen. Moreover, additional processing operation parameters may also be selected using the same approach.

In an embodiment, the audio encoder is configured to select one or more associations between a source frequency range and a target frequency range for a bandwidth extension. The audio encoder is configured to selectively allow or prohibit a change of an association between a source frequency range and a target frequency range in dependence on an evaluation of a modulation of an envelope (for example, of an audio signal to be encoded) in an old or a new target frequency range.

By using such a concept, a change of an association between a source frequency range and a target frequency range can be prohibited, if such a change of the association between the source frequency range and the target frequency range would bring along noticeable artefacts. Thus, a switching between frequency shifts of the intelligent gap filling may be limited. For example, a change of the association between the source frequency range and the target frequency range may selectively be allowed if it is found that there is a sufficient modulation of the envelope (for example, higher than a certain threshold) which (sufficiently) masks the modulation caused by the change of the association.

In an embodiment, the audio encoder is configured to determine a modulation strength of an envelope in a (old or new) target frequency range in a modulation frequency range corresponding to a frame rate of the encoder and to determine a sensitivity measure in dependence on the determined modulation strength (for example, such that the similarity measure is inversely proportional to the modulation strength).

The audio encoder is configured to decide whether it is allowed or prohibited to change an association between a target frequency range and a source frequency range in dependence on the sensitivity measure (for example, only to allow a change of an association between a target frequency range and a source frequency range when the sensitivity measure is smaller than a predetermined threshold value, or only to allow a change of an association between a target frequency range and a source frequency range when there is a modulation strength which is larger than a threshold level in the target frequency range).

Accordingly, it can be reached that the change of the association between a target frequency range and a source frequency range only occurs if a (parasitic) modulation caused by such a change is sufficiently masked by the (original) modulation in the target frequency range (into which the parasitic modulation would be introduced). Thus, audible artefacts can be avoided efficiently).

An embodiment according to the present invention creates an audio encoder for encoding an audio signal, wherein the audio encoder is configured to determine one or more coding parameters in dependence on an audio signal to be encoded using a neural network. The neural network is trained using an audio similarity evaluator as discussed herein.

By using a neural network, which is trained using the audio similarity-value evaluator mentioned above, to decide about the one or more coding parameters, a computational complexity can further be reduced. In other words, the audio similarity evaluation, as mentioned herein, can be used to provide the training data for a neural network, and the neural network can adapt itself (or can be adapted) to make coding parameter decisions which are sufficiently similar to coding parameter decisions which would be obtained by assessing the audio quality using the audio similarity evaluator.

An embodiment according to the present invention creates an audio similarity evaluator.

The audio similarity evaluator is configured to obtain envelope signals for a plurality of (advantageously overlapping) frequency ranges (for example, using a filterbank or a Gammatone filterbank and a rectification and a temporal low pass filtering and one or more adaptation processes which may, for example, model a pre-masking and/or a post-masking in an auditory system) on the basis of an input audio signal (for example, to perform an envelope demodulation in spectral sub-bands).

The audio similarity evaluator is configured to compare an analysis representation of the input audio signal (for example, an "internal representation", like the obtained modulation information or a time-frequency-domain representation) with a reference analysis representation associated with a reference audio signal (for example, using an internal difference representation, wherein the internal difference representation may, for example, describe a difference between the obtained analysis representation and the reference analysis representation, wherein one or more weighting operations or modification operations may be applied, like a scaling of the internal difference representation based on a degree of co-modulation or an asymmetrical weighting of positive and negative values of the internal difference representation), in order to obtain an information about a similarity between the input audio signal and the reference audio signal (for example, a single value describing a perceptual similarity between the input audio signal and the reference audio signal).

The audio similarity evaluator is configured to adjust a weighting of a difference between the obtained analysis representation (e.g. a modulation information; for example, an internal representation) and the reference analysis representation (for example, a reference modulation information associated with a reference audio signal) in dependence on a comodulation (e.g. between the obtained envelope signals or an obtained modulation information) in two or more adjacent acoustic frequency ranges of the input audio signal or in dependence on a comodulation (e.g. between envelope signals associated with the reference signal or between the reference modulation information) in two or more adjacent acoustic frequency ranges of the reference audio signal (wherein, for example, an increased weight is given to the difference in case that a comparatively high degree of comodulation is found when compared to a case in which a comparatively low degree of comodulation is found) (and wherein the degree of comodulation is, for example, found by determining a covariance between temporal envelopes associated with different acoustic frequency ranges).

This embodiment is based on the finding that a comodulation in two or more adjacent frequency ranges typically has the effect that distortions in such comodulated frequency ranges are perceived stronger than distortions in non-comodulated (or weakly-comodulated) adjacent frequency ranges. Accordingly, by weighting deviations between audio signals to be compared (for example, between an input audio signal and a reference audio signal) relatively stronger in strongly comodulated frequency ranges (when compared to a weighting in non-comodulated or more weakly comodulated frequency ranges), the evaluation of the audio quality can be performed in a manner which is well-adapted to human perception. Typically, differences between obtained analysis representations, which may be based on envelope signals for a plurality of frequency ranges, may be compared, and in such analysis representations, frequency ranges, which comprise a comparatively higher comodulation may be weighted stronger than frequency ranges comprising a comparatively smaller comodulation. Accordingly, the similarity evaluation may be well-adapted to a human perception.

An embodiment according to the invention creates a method for evaluating a similarity between audio signals.

The method comprises obtaining envelope signals for a plurality of (advantageously overlapping) frequency ranges (for example, using a filterbank or a Gammatone filterbank and a rectification and a temporal low pass filtering and one or more adaptation processes which may, for example, model a pre-masking and/or a post-masking in an auditory system) on the basis of an input audio signal (for example, to perform an envelope demodulation in spectral sub-bands).

The method comprises obtaining a modulation information (for example, output signals of the modulation filters)

associated with the envelope signals for a plurality of modulation frequency ranges (for example, using a modulation filterbank or using modulation filters). The modulation information describes (for example, in the form of output signals of the modulation filterbank or in the form of output signals of the modulation filters) the modulation of the envelope signals (for example, temporal envelope signals or spectral envelope signals). The modulation information may, for example, be considered as an internal representation and may, for example, be used to perform an envelope modulation analysis.

The method comprises comparing the obtained modulation information (for example, an internal representation) with a reference modulation information associated with a reference audio signal (for example, using an internal difference representation, wherein the internal difference representation may, for example describe a difference between the obtained modulation information and the reference modulation information, wherein one or more weighting operations or modification operations may be applied, like a scaling of the internal difference representation based on a degree of co-modulation or an asymmetrical weighting of positive and negative values of the internal difference representation), in order to obtain an information about a similarity between the input audio signal and the reference audio signal (for example, a single value describing a perceptual similarity between the input audio signal and the reference audio signal).

An embodiment according to the invention creates a method for encoding an audio signal, wherein the method comprises determining one or more coding parameters in dependence on an evaluation of a similarity between an audio signal to be encoded and an encoded audio signal, and wherein the method comprises evaluating the similarity between the audio signal to be encoded and the encoded audio signal as discussed herein (wherein, for example, the audio signal to be encoded is used as the reference audio signal and wherein a decoded version of an audio signal encoded using one or more candidate parameters is used as the input audio signal for the audio similarity evaluator).

An embodiment according to the invention creates a method for encoding an audio signal.

The method comprises determining one or more coding parameters in dependence on an audio signal to be encoded using a neural network, wherein the neural network is trained using a method for evaluating a similarity between audio signals as discussed herein An embodiment according to the invention creates a method for evaluating a similarity between audio signals (for example, between an input audio signal and a reference audio signal).

The method comprises obtaining envelope signals for a plurality of (advantageously overlapping) frequency ranges (for example, using a filterbank or a Gammatone filterbank and a rectification and a temporal low pass filtering and one or more adaptation processes which may, for example, model a pre-masking and/or a post-masking in an auditory system) on the basis of an input audio signal (for example, to perform an envelope demodulation in spectral sub-bands).

The method comprises comparing an analysis representation of the input audio signal (for example, an "internal representation", like the obtained modulation information or a time-frequency-domain representation) with a reference analysis representation associated with a reference audio signal (for example, using an internal difference representation, wherein the internal difference representation may, for example describe a difference between the obtained analysis representation and the reference analysis representation, wherein one or more weighting operations or modification operations may be applied, like a scaling of the internal difference representation based on a degree of co-modulation or an asymmetrical weighting of positive and negative values of the internal difference representation), in order to obtain an information about a similarity between the input audio signal and the reference audio signal (for example, a single value describing a perceptual similarity between the input audio signal and the reference audio signal), The method comprises adjusting a weighting of a difference between the obtained analysis representation (e.g. a modulation information; for example, an internal representation) and the reference analysis representation (for example, a reference modulation information associated with a reference audio signal) in dependence on a comodulation. For example, the weighting is adjusted in dependence on a comodulation (e.g. between the obtained envelope signals or an obtained modulation information) in two or more adjacent acoustic frequency ranges of the input audio signal. Alternatively, the weighting is adjusted in dependence on a comodulation (e.g. between envelope signals associated with the reference signal or between the reference modulation information) in two or more adjacent acoustic frequency ranges of the reference audio signal. For example, an increased weight is given to the difference in case that a comparatively high degree of comodulation is found when compared to a case in which a comparatively low degree of comodulation is found. The degree of comodulation is, for example, found by determining a covariance between temporal envelopes associated with different acoustic frequency ranges.

These methods are based on the same considerations as the above-mentioned audio similarity evaluators and the above-mentioned audio encoders.

Moreover, the methods can be supplemented by any features, functionalities and details discussed herein with respect to the audio similarity evaluators and with respect to the audio encoders. The methods can be supplemented by such features, functionalities and details both individually and taken in combination.

An embodiment according to the invention creates a computer program for performing the methods as discussed herein when the computer program runs on a computer.

The computer program can be supplemented by any of the features, functionalities and details described herein with respect to the corresponding apparatuses and methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments according to the present invention will subsequently be described taking reference to the enclosed figures in which:

FIG. 2a. 2b show a block schematic diagram of an audio similarity evaluator, according to an embodiment of the present invention;

DETAILED DESCRIPTION OF THE INVENTION

In the following, embodiments according to the present application will be described. However, it should be noted that the embodiments described in the following can be used individually, and can also be used in combination.

Moreover, it should be noted that features, functionalities and details described with respect to the following embodiments can optionally be introduced into any of the embodiments as defined by the claims, both individually and taken in combination.

Moreover, it should be noted that the embodiments described in the following can optionally be supplemented by any of the features, functionalities and details as defined in the claims.

1. AUDIO SIMILARITY EVALUATOR ACCORDING TO FIG. 1

Figure 1:
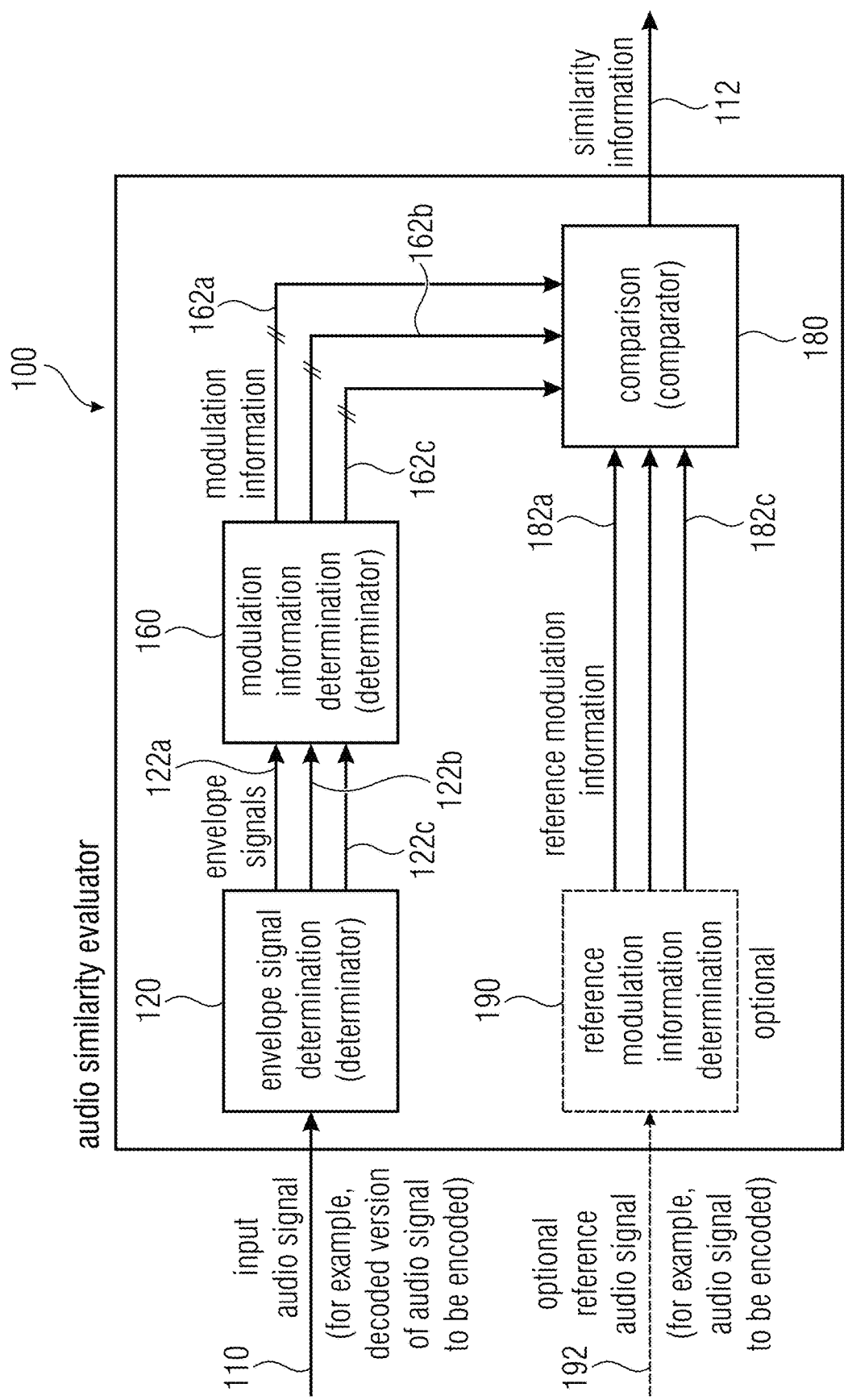
FIG. 1 shows a block schematic diagram of an audio similarity evaluator, according to an embodiment of the present invention.

FIG. 1 shows a block schematic diagram of an audio similarity evaluator, according to an embodiment of the invention.

The audio similarity evaluator 100 according to FIG. 1 receives an input audio signal 110 (for example, an input audio signal of the audio similarity evaluator) and provides, on the basis thereof, a similarity information 112, which may, for example, take the form of a scalar value.

The audio similarity evaluator 100 comprises an envelope signal determination (or envelope signal determinator) 120 which is configured to obtain envelope signals 122a, 122b, 122c for a plurality of frequency ranges on the basis of the input audio signal. Advantageously, the frequency ranges for which the envelope signals 122a-122c are provided, may be overlapping. For example, the envelope signal determinator may use a filterbank or a Gamma-tone filterbank and a rectification and a temporal low-pass filtering and one or more adaptation processes which may, for example, model a pre-masking and/or a post-masking in an auditory system. In other words, the envelope signal determination 120 may, for example, perform an envelope demodulation of spectral subbands of the input audio signal.

Moreover, the audio similarity evaluator 100 comprises a modulation information determination (or modulation information determinator) 160, which receives the envelope signals 122a-122c and provides, on the basis thereof, modulation information 162a-162c. Generally speaking, the modulation information determination 160 is configured to obtain a modulation information 162a-162c associated with the envelope signals 122a-122c for a plurality of modulation frequency ranges. The modulation information describes the (temporal) modulation of the envelope signals.

The modulation information 162a-162c may, for example, be provided on the basis of output signals of modulation filters or on the basis of output signals of a modulation filterbank. For example, the modulation information 162a may be associated to a first frequency range, and may, for example, describe the modulation of a first envelope signal 122a (which is associated with this first frequency range) for a plurality of modulation frequency ranges. In other words, the modulation information 162a may not be a scalar value, but may comprise a plurality of values (or even a plurality of sequences of values) which are associated with different modulation frequencies that are present in the first envelope signal 122a which is associated with a first frequency range of the input audio signal. Similarly, the second modulation information 162b may not be a scalar value, but may comprise a plurality of values or even a plurality of sequences of values associated with different modulation frequency ranges which are present in the second envelope signal 122b, which is associated with a second frequency range of the input audio signal 110. Thus, for each of a plurality of frequency ranges under consideration (for which separate envelope signals 122a-122c are provided by the envelope signal determinator 120), modulation information may be provided for a plurality of modulation frequency ranges. Worded yet differently, for a portion (for example a frame) of the input audio signal 110, a plurality of sets of modulation information values are provided, wherein the different sets are associated with different frequency ranges of the input audio signal, and where each of the sets describes a plurality of modulation frequency ranges (i.e. each of the sets describes the modulation of one envelope signal).

Moreover, the audio similarity evaluator comprises a comparison or comparator 180, which receives the modulation information 162a-162c and also a reference modulation information 182a-182c which is associated with a reference audio signal. Moreover, the comparison 180 is configured to compare the obtained modulation information 162a-162c (obtained on the basis of input audio signal 110) with the reference modulation information 182a-182c associated with a reference signal, in order to obtain an information about a (perceptually-judged) similarity between the input audio signal 110 and the reference audio signal.

For example, the comparison 180 may obtain a single value describing a perceptual similarity between the input audio signal and the reference audio signal as the similarity information 112. Moreover, it should be noted that the comparison 180 may, for example, use an internal difference representation, wherein the internal difference representation may, for example, describe a difference between the obtained modulation information and the reference modulation information. For example, one or more weighting operations or modification operations may be applied, like a scaling of the internal difference representation based on a degree of comodulation and/or an asymmetrical weighting of positive and negative values of the internal difference representation when deriving the similarity information.

However, it should be noted that additional (optional) details of the envelope signal determination 120, of the modulation information determination 160 and of the comparison 180 are described below and can optionally be introduced into the audio similarity evaluator 100 of FIG. 1, both individually and taken in combination.

Optionally, the reference modulation information 182a-182c may be obtained using an optional reference modulation information determination 190 on the basis of a reference audio signal 192. The reference modulation information determination may, for example, perform the same functionality like the envelope signal determination 120 and the modulation information determination 160 on the basis of the reference audio signal 192.

However, it should be noted that the reference modulation information 182a-182c can also be obtained from a different source, for example, from a data base or from a memory or from a remote device which is not part of the audio similarity evaluator.

It should further be noted that the blocks shown in FIG. 1 may be considered as (functional) blocks or (functional) units of a hardware implementation or of a software implementation, as will be detailed below.

2. AUDIO SIMILARITY EVALUATOR ACCORDING TO FIG. 2

FIGS. 2a and 2b show a block schematic diagram of an audio similarity evaluator 200, according to an embodiment of the present invention.

The audio similarity evaluator 200 is configured to receive an input audio signal 210 and to provide, the basis thereof, a similarity information 212. Moreover, the audio similarity evaluator 200 may be configured to receive a reference modulation information 282 or to compute the reference modulation information 282 by itself (for example, in the same manner in which the modulation information is computed). The reference modulation information 282 is typically associated with a reference audio signal.

The audio similarity evaluator 200 comprises an envelope signal determination 220, which may, for example, comprise the functionality of the envelope signal determination 120. The audio similarity evaluator may also comprise a modulation information determination 260 which may, for example, comprise the functionality of the modulation information determination 160. Moreover, the audio similarity evaluator may comprise a comparison 280 which may, for example, correspond to the comparison 180.

Moreover, the audio similarity evaluator 200 may optionally comprise a comodulation determination, which may operate on the basis of different input signals and which may be implemented in different manners. Examples for the comodulation determination are also shown in the audio similarity evaluator.

In the following, details of the individual functional blocks or functional units of the audio similarity evaluator 200 will be described.

The envelope signal determination 220 comprises a filtering 230, which receives the input audio signal 210 and which provides, on the basis thereof, a plurality of filtered (advantageously band-pass-filtered) signals 232a-232e. The filtering 230 may, for example, be implemented using a filterbank and may, for example, model a basilar-membrane filtering. For example, the filters may be considered as "auditory filters" and may, for example, be implemented using a Gamma-tone filterbank. In other words, bandwidths of bandpass filters which perform the filtering may increase with increasing center frequency of the filters. Thus, each of the filtered signals 232a-232e may represent a certain frequency range of the input audio signal, wherein the frequency ranges may be overlapping (or may be non-overlapping in some implementations).

Moreover, similar processing may be applied to each of the filtered signals 232a, such that only one processing path for one given (representative) filtered signal 232c will be described in the following. However, the explanations provided with respect to the processing of the filtered signal 232c can be taken over for the processing of the other filtered signals 232a, 232b, 232d, 232e (wherein, in the present example, only five filtered signals are shown for the sake of simplicity, while a significantly higher number of filtered signals could be used in actual implementations).

A processing chain, which processes the filtered signal 232c under consideration may, for example, comprise a rectification 236, a low-pass filtering 240 and an adaptation 250.

For example, a half-wave rectification 236 (which may, for example, remove the negative half-wave and create pulsating positive half-waves) may be applied to the filtered signal 232c, to thereby obtain a rectified signal 238. Furthermore, a low-pass filtering 240 is applied to the rectified signal 238 to thereby obtain a smooth low-pass signal 242. The low-pass filtering may, for example, comprise a cutoff frequency of 1000 Hz, but different cutoff frequencies (which may advantageously be smaller than 1500 Hz or smaller than 2000 Hz) may be applied.

The low-pass filtered signal 242 is processed by an adaptation 250, which may, for example, comprise a plurality of cascaded "automatic gain control" stages an optionally one or more limitation stages. The automatic gain control stages may also be considered as "adaptation loops". For example, each of the automatic gain control (or adaptive gain control) stages may comprise a loop structure. The input signal of an automatic gain control stage (or adaptation loop) (for example, for the first automatic gain control stage, the low-pass filtered signal 242, and for subsequent automatic gain control stages, the output signal of the previous automatic gain control stage) may be scaled by an adaptive gain control 254. An output signal 259 of the automatic gain control stage may be the scaled version of input signal of the respective automatic gain control stage, or a limited version of the scaled version 255 (for example, in the case that an optional limitation 256 is used, which limits a range of values of the signal). In particular, the gain which is applied in the scaling 254 may be time-variant, and may be adjusted, with a time constant associated with the individual automatic gain control stage, in dependence on the scaled signal 255 provided by the receptive stage. For example, a low-pass filtering 257 may be applied to derive a gain control information 258 which determines a gain (or scaling factor) of the adaptive gain control 254. The time constant of the low-pass filtering 257 may vary from stage to stage, to thereby model different masking effects that occur in the human auditory system. It has been found that the usage of a plurality of automatic gain control stages brings along particularly good results, wherein usage of five cascaded automatic gain control stages is recommended (but not necessary).

As an (optional) alternative to the rectification and low-pass filtering, a Hilbert envelope could be obtained on the basis of output signals 232a-232e of the filters or filtering operation 230, in order to obtain, for example, the signal 242.

Generally speaking, it is (optionally) possible to demodulate the output signals 232a-232e of the filters or filtering operation 230, in order to obtain, for example, the signal 242.

To conclude, the adaptation 250 comprises a sequence (or cascade) of automatic gain control stages, wherein each of the gain control stages performs a scaling of its input signal (the low-pass filtered signal 242, or the output signal of the previous stage) and optionally a limitation operation (to thereby avoid excessively large signals). The gain or scaling factor applied in each of the automatic gain control stages is determined using a feedback loop structure in dependence on an output of the respective scaling operation, wherein some inertness (or delay) is introduced, for example, using a low-pass filter in the feedback path.

For further details regarding the adaptation, reference is also made to the below description, wherein any of the details described below can optionally be introduced into the adaptation 250.

The adaptation 250 provides an adapted signal 252, which may be an output signal of a last automatic gain control stage of the cascade (or sequence) of automatic gain control stages. The adapted signal 252 may, for example, be considered as an envelope signal and may, for example, correspond to one of the envelope signals 122a to 122c.

Alternatively, a logarithmic transform may optionally be applied in order to obtain the envelope signals (222a to 222e).

As another alternative, another modeling of a forward masking may optionally be applied, in order to obtain the envelope signals (222a to 222e)

As already mentioned, the envelope signal determination 220 may provide individual envelope signals associated with the different frequency ranges. For example, one envelope signal may be provided per filtered signal (bandpass signal) 232a-232e.

In the following, details of the modulation information determination will be described.

The modulation information determination receives a plurality of envelope signals 222a-222e (for example, one envelope signal per frequency range of the input audio signal under consideration). Moreover, the modulation information determination 260 provides modulation information 262a-262e (for example, for each of the envelope signals 222a-222e under consideration). In the following, the processing will be described for one representative envelope signal 222c, but similar or identical processing may be performed for all of the considered envelope signals 222a-222e.

For example, a filtering 264 is applied to the envelope signal 222c. Alternatively, within the filtering 264, or in addition to the filtering 264, a down-sampling may be applied. The filtering may be performed by a modulation filterbank or by a plurality of modulation filters. In other words, different frequency ranges of the envelope signal 222c may be separated by the filtering tool 264 (wherein said frequency ranges may optionally be overlapping). Thus, the filtering 264 typically provides a plurality of modulation-filtered signals 266a-266e on the basis of the envelope signal 222c. An (optional) DC removal 270 and an (optional) phase information removal 274 may be applied to each of the modulation-filtered signals 266a-266e, to thereby derive post-processed modulation-filtered signals 276a-276e. The post-processed modulation-filtered signals 276a-276e are associated with different modulation frequencies (or modulation frequency ranges) within one frequency range of the input audio signal 210. In other words, the post-processed modulation filtered signals 276a-276e may represent a set of modulation values associated with a frequency range of the input audio signal 210 on which the envelope signal 222c is based. Similarly, post-processed and modulation-filtered signals may be obtained which are associated with different frequency ranges of the input audio signals on the basis of different envelope signals 222a, 222b, 222d, 222e, and may represent further sets of modulation values associated with respective frequency ranges of the input audio signal.

To conclude, the modulation information determination 260 provides a set of modulation values for each frequency range of the input audio signal under consideration.

For example, an amount of information may be reduced in such a manner that only one modulation value is provided per modulation frequency (or per modulation frequency range) and per frequency range under consideration (such that the post-processed modulation filtered signals 276a-276e are effectively represented by a single value each (wherein this single value may be considered as a modulation value).

In the following, details regarding the comparison 280 will be described.

The comparison 280 receives the sets 262a-262e of modulation values, which are provided by the modulation information determination 260 described before. Also, the comparison 280 typically receives sets 282a-282e of reference modulation values, which are typically associated with the reference audio signal and which are considered a reference modulation information 282 in their entirety.

The comparison 280 optionally applies a temporal smoothing 284 to the individual modulation values of the sets 262a-262e of modulation values. Furthermore, the comparison 280 forms (or computes) differences between respective modulation values and their associated reference modulation values.

In the following, the processing will be described for one individual (representative) modulation value (which is associated with a modulation frequency or modulation frequency range, and which is also associated with a frequency range of the input audio signal 210). It should be noted here that the modulation value under consideration is designated with 276c and that its associated reference modulation value is designated as 283c. As can be seen, a temporal smoothing 284c is optionally applied to the modulation value 276c before a difference formation 288c is applied. The difference formation 288c determines the difference between the modulation value 276c and its associated reference modulation value 283c. Accordingly, a difference value 289c is obtained, wherein, optionally, temporal smoothing 290c may be applied to the difference value 289c. Moreover, a weighting 292c is applied to the difference value 289c or to a temporally smoothed version 291c thereof. The weighting 292c may, for example, be dependent on a comodulation information associated with the frequency range to which the difference value 289c is associated. Moreover, the weighting 292c may optionally also be sign-dependent or "asymmetrical".

For example, if the frequency range associated with the difference value 289c comprises a comparatively high comodulation with one or more adjacent frequency ranges, a comparatively high weight may be applied to the difference value 289c, or to the temporarily smoothed version 291c thereof, and if the frequency range to which the difference value 289c is associated comprises a comparatively small comodulation with one or more adjacent frequency ranges, then a comparatively small weight may be applied to the difference value 289c, or to the temporarily smoothed version 291c thereof. Moreover, a comparatively higher weight may be applied to positive values of the difference value 289c or to the temporally smoothed version 291c thereof when compared to negative values of the difference value 289c or to the temporally smoothed version 291c thereof (or vice versa). In other words, generally speaking a sign dependent weighting may be applied to the difference value 289c, or to the temporarily smoothed version 291 thereof. Accordingly, the weighted difference value 294c is obtained.

However, generally speaking, it should be noted that weighted difference values (or unweighted difference values, in case the optional weighting is omitted) are obtained for each modulation frequency (or modulation frequency range) under consideration of each frequency range of the input audio signal under consideration. Thus, a comparatively large number of weighted difference values is obtained, which are input into a combination processing or evaluation processing 298.

The combination processing or evaluation processing 298 may, for example, form a single scalar value, that constitutes the similarity information 212, on the basis of the weighted difference values (which, together, form a "difference representation" or "internal difference representation IDR"). For example, the combination processing or evaluation processing may perform a sum-of-squares combination of the weighted difference values 294a to 294e, to thereby derive the similarity information 212.

To conclude, the envelope signal determination 220 provides envelope signals 222a-222e, for example, one for each frequency band (of the input audio signal) under consideration.

A filtering or filterbank, a rectification, a low-pass filtering and an adaptation may be used in this processing. The modulation information determination determines, for example, one modulation value per modulation frequency (or modulation frequency range) under consideration and per frequency range (of the input audio signal) under consideration. Thus, there is one set of modulation values per frequency range (of the input audio signal) under consideration. A filtering, a DC removal and a phase information removal may be used in this processing. Finally, the comparison 280 compares the modulation values obtained on the basis of the input audio signal with the reference modulation values associated with the reference audio signal, wherein optionally a weighting of the difference values is applied. Finally, the weighted difference values are combined into a compact similarity information, which may take the form of a single scalar value. Effectively, the comparison may determine a (scalar) value which represents the difference between the modulation values obtained on the basis of the input audio signal and the modulation values associated with the reference audio signal. The comparison may, for example, form a "distance value" or "norm", wherein different types of weighting may optionally be applied.

In the following, some options for the determination of the comodulation (or comodulation information) will be described, wherein it should be noted that the comodulation information may, for example, be used to adjust the weighting of the difference values (for example, of the difference value 289c) or of temporarily smoothened versions thereof (for example, of the temporarily smoothened difference value 291c).

As an example, a comodulation may be determined on the basis of the envelope signals 222a-222e. For example, a comodulation determinator 299a receives the envelope signals 222a-222e, and provides on the basis thereof, a comodulation information 299b. For example, the comodulation determinator 299a may (for example, individually) apply a low-pass filtering to the different envelope signals 222a-222e. Moreover, the comodulation determinator 299a may, for example, determine a covariance of two or more adjacent (low-pass filtered) envelope signals, to thereby obtain a comodulation information associated with a certain frequency range. For example, the comodulation determinator 299a may determine a covariance between a given (low-pass filter) envelope signal 222c and two, three, four or more envelope signals 222a, 222b, 222d, 222e associated with adjacent frequency ranges, to thereby derive the comodulation information associated with the frequency range under consideration. However, the comodulation determinator 299 may determine individual comodulation information for a plurality of frequency ranges (or, equivalently, associated with a plurality of envelope signals).

However, alternatively, a comodulation determinator 299c may be used, which determines the comodulation information 299d on the basis of the modulation information 262a-262e. For example, the comodulation determinator 299c may compare the modulation information associated with adjacent frequency ranges, to thereby obtain the comodulation information (for example, for different frequency ranges). For example, if the modulation in one, two, three, four or more frequency ranges which are adjacent to a given frequency range is similar to the modulation in the given frequency range, a comparatively high degree of comodulation may be indicated by the comodulation information (and vice versa). Thus, similar to the comodulation determinator 299a, the comodulation determinator 299c may provide individual comodulation information associated with different frequency ranges.

Alternatively, a comodulation determinator 299e may be used, which determines the comodulation information 299f on the basis of a reference audio signal. For example, the comodulation determinator 299e may determine the comodulation information 299f on the basis of the reference modulation information 282a-282e. For example, the comodulation determinator 299e may comprise the same functionality as the comodulation determinator 299c.

However, the comodulation determinator 299e may also determine the comodulation information 299f on the basis of the reference audio signal using the same approach as the comodulation determinator 299a.

However, it should be noted that different concepts for the determination of the comodulation information may also be useful. Also, it should be noted that the determination of the comodulation information should be considered as being optional in its entirety.

Optionally, the reference modulation information 282*a*-282*e* may be obtained using an optional reference modulation information determination 281*a* on the basis of a reference audio signal 281. The reference modulation information determination 281*a* may, for example, perform the same functionality like the envelope signal determination 220 and the modulation information determination 260 on the basis of the reference audio signal 281.

However, it should be noted that the reference modulation information 282*a*-282*e* can also be obtained from a different source, for example, from a data base or from a memory or from a remote device which is not part of the audio similarity evaluator.

To conclude, FIGS. 2*a* and 2*b* disclose the functionality of an audio similarity evaluator, according to an embodiment of the invention. However, it should be noted that individual functionalities could be omitted or modified substantially, without deviating from the fundamental concepts. It should be noted that any of those details which go beyond the concept of the audio similarity evaluator 100 should be considered as being optional, and can be omitted or modified individually.

3. AUDIO ENCODER ACCORDING TO FIG. 3

Figure 3:
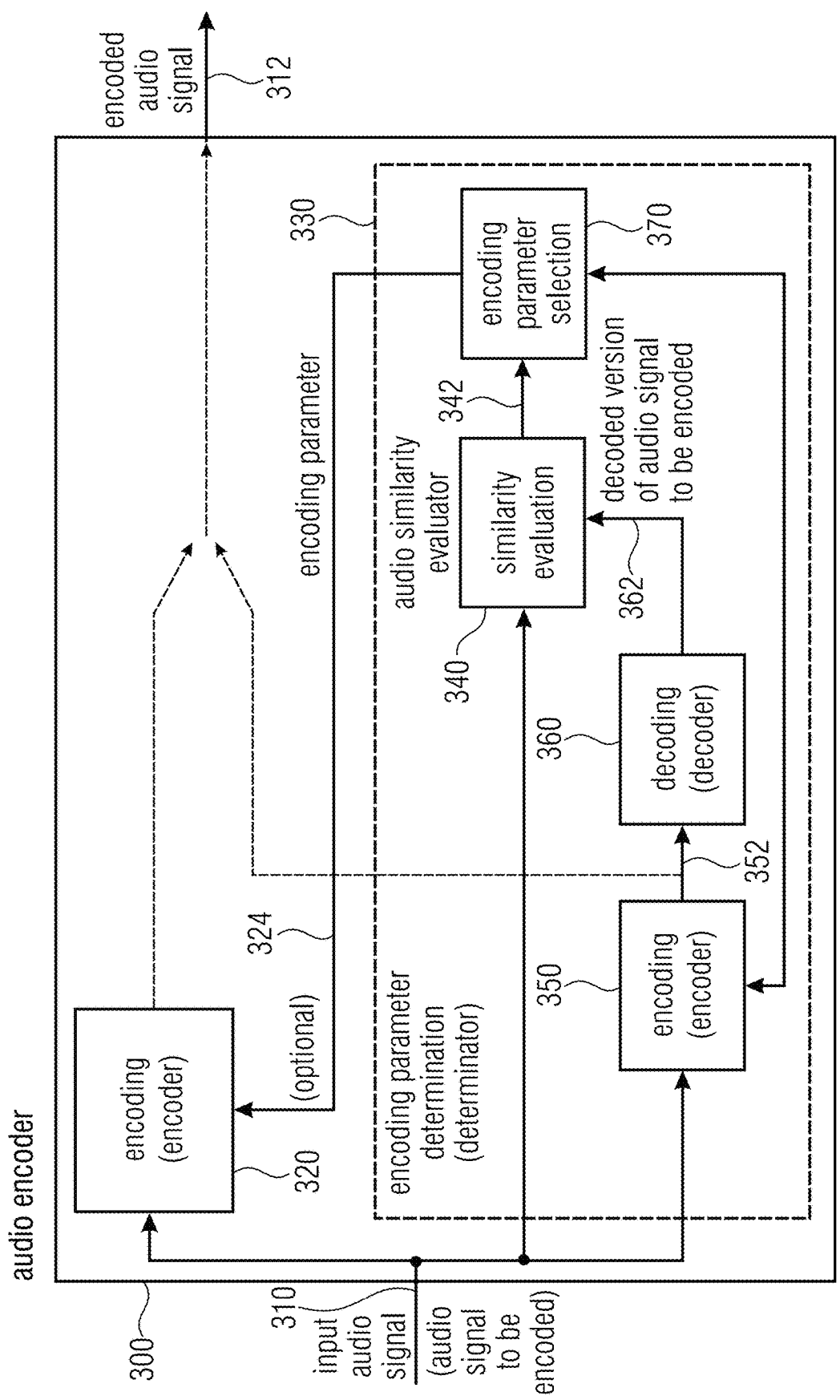
FIG. 3 shows a block schematic diagram of an audio encoder with automated selection, according to an embodiment of the present invention.

FIG. 3 shows a block schematic diagram of an audio encoder 300, according to an embodiment of the present invention.

The encoder 300 is configured to receive an input audio signal 310 (which is an audio signal to be encoded, or an "original audio signal") and to provide, on the basis thereof, an encoded audio signal 312. The encoder 300 comprises an encoding (or encoder, or core encoder) 320, which is configured to provide the encoded audio signal 312 on the basis of the input audio signal 310. For example, the encoding 320 may perform a frequency domain encoding of the audio content, which may be based on the AAC encoding concept, or one of its extensions. However, the encoding 320 may, for example, perform the frequency domain encoding only for a part of the spectrum, and may apply a parametric bandwidth extension parameter determination and/or a parametric gap filling (as, for example, the "intelligent gap filling" IGF) parameter determination, to thereby provide the encoded audio signal (which may be a bitstream comprising an encoded representation of the spectral values, and an encoded representation of one or more encoding parameters or bandwidth extension parameters).

It should be noted, that the present description refers to encoding parameters. However, instead if encoding parameters, all the embodiments can generally use "coding parameters", which may be encoding parameters (which are typically used both by the encoder and by the decoder, or only by the encoder) or decoding parameters (which are typically only used by the decoder, but which are typically signaled to the decoder by the encoder).

Typically, the encoding 320 can be adjusted to characteristics of the signal, and/or to a desired coding equality, using one or more encoding parameters 324. The encoding parameters may, for example, describe the encoding of the spectral values and/or may describe one or more features of the bandwidth extension (or gap filling), like an association between source tiles and target tiles, a whitening parameter, etc.

However, it should be noted that different encoding concepts can also be used, like a linear-predictive-coding based encoding.

Moreover, the audio encoder comprises an encoding parameter determination which is configured to determine the one or more encoding parameters in dependence on an evaluation of a similarity between an audio signal to be encoded and an encoded audio signal. In particular, the encoding parameter determination 330 is configured to evaluate the similarity between the audio signal to be encoded (i.e., the input audio signal 310) and the encoded audio signal using an audio similarity evaluator 340. For example, the audio signal to be encoded (i.e., the input audio signal 310) is used as a reference audio signal 192, 281 for the similarity evaluation by the audio similarity evaluator 340 and a decoded version 362 of an audio signal 352 encoded using one or more encoding parameters under consideration is used as the input signal (e.g., as the signal 110, 210) for the audio similarity evaluator 340. In other words, an encoded and subsequently decoded version 362 of the original audio signal 310 is used as in input signal 110, 210 for the audio similarity evaluator, and the original audio signal 310 is used as a reference signal 192, 281 for the audio similarity evaluator.

Thus, the encoding parameter determination 330 may, for example, comprise an encoding 350 and a decoding 360, as well as an encoding parameter selection 370. For example, the encoding parameter selection 370 may be coupled with the encoding 350 (and optionally also with the decoding 360) to thereby control the encoding parameters used by the encoding 350 (which typically correspond to decoding parameters used by the decoding 360). Accordingly, an encoded version 352 of the input audio signal 310 is obtained by the encoding 350, and an encoded and decoded version 362 is obtained by the decoding 360, wherein the encoded and decoded version 362 of the input audio signal 310 is used as an input signal for the similarity evaluation. A possible codec delay introduced in the signal path via 350 and 360 should advantageously be compensated for in the direct path of 310 before entering the similarity evaluation.

Accordingly, the encoding parameter selection 370 receives a similarity information 342 from the audio similarity evaluator 340. Typically, the encoding parameter selection 370 receives the similarity information 342 for different encoding parameters or sets of encoding parameters and then decides which encoding parameter or which set of encoding parameters should be used for the provision of the encoded audio signal 312, which is output by the audio encoder (for example, in the form of an audio bitstream to be sent to an audio decoder or to be stored).

For example, the encoding parameter selection 370 may compare the similarity information which is obtained for different encoding parameters (or for different sets of encoding parameters) and to select those encoding parameters for the provision of the encoded audio signal 312 which result in the best similarity information or, at least, in an acceptably good similarity information.

Moreover, it should be noted that the similarity evaluation 340 may, for example, be implemented using the audio similarity evaluator 100 according to FIG. 1 or using the audio similarity evaluator 200 according to FIG. 2 (or using any of the other audio similarity evaluators discussed herein). Moreover, it should be noted that the encoding 320 may optionally be omitted. For example, the encoded audio information 352, which is provided as an intermediate information when selecting the encoding parameter or encoding parameters, may be maintained (for example, saved as temporary information) and may be used in the provision of the encoded audio signal 312.

It should be noted that the audio encoder 300 according to FIG. 3 can be supplemented by any of the features, functionalities and details described herein, both individually and taken in combination. In particular, any of the details of the audio similarity evaluator described herein can be introduced into the audio similarity evaluator 340.

4. AUDIO ENCODER 400 ACCORDING TO FIG. 4

Figure 4:
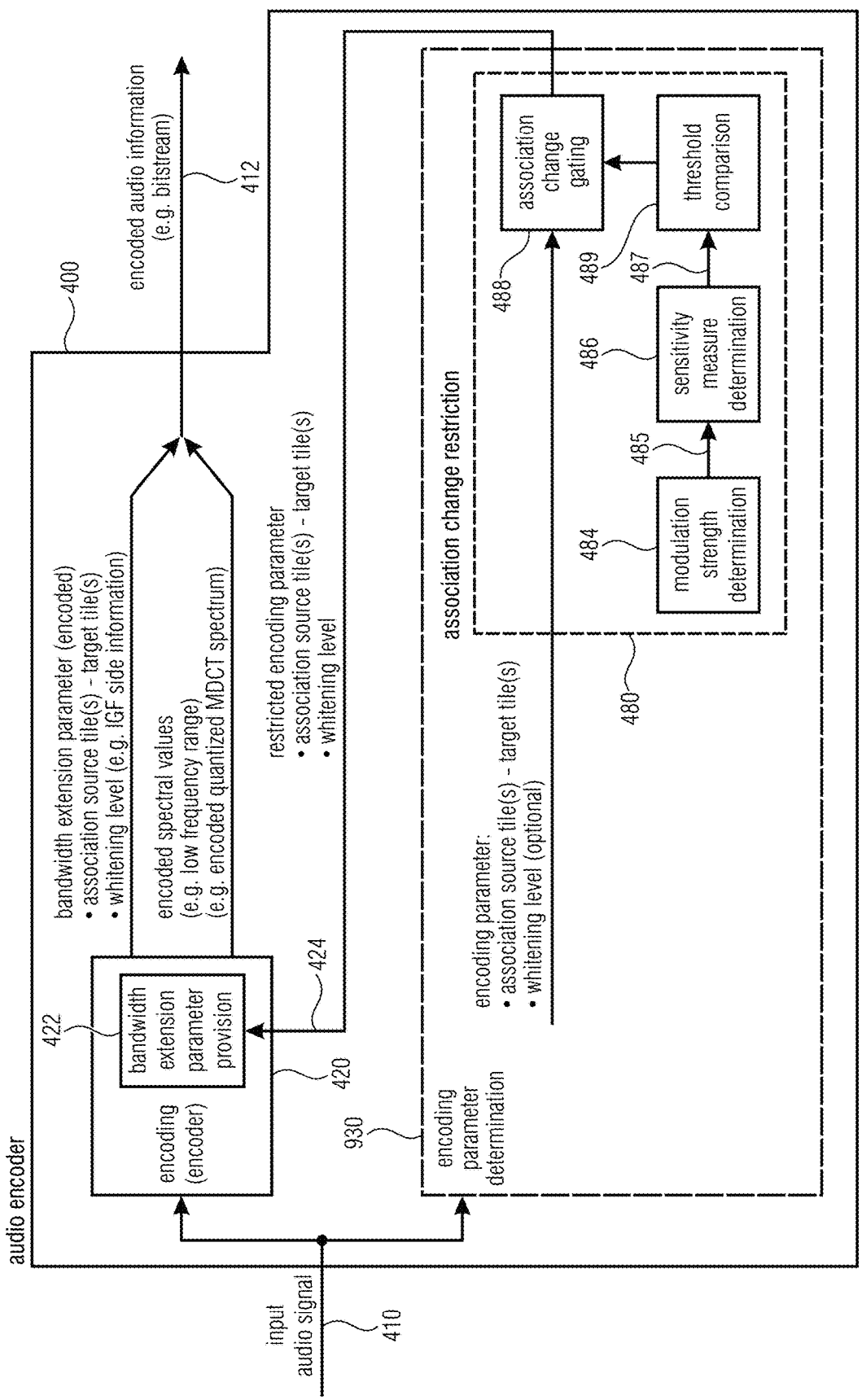
FIG. 4 shows a block schematic diagram of an audio encoder with change gating, according to an embodiment of the present invention.

FIG. 4 shows a block schematic diagram of an audio encoder 400, according to an embodiment of the present invention.

It should be noted that the audio encoder 400 is similar to the audio encoder 300, such that the above explanations also apply. Here, the audio encoder 400 is configured to receive an input audio signal 410 and to provide, on the basis thereof, an encoded audio signal or an encoded audio information 412, which may, for example, take the form of a bitstream comprising encoded spectral values and encoded encoding parameters.

The audio encoder 400 comprises an encoding 420, which may, for example, correspond to the encoding 320. However, the encoding 420 may, for example, comprise a bandwidth extension parameter provision 422, which may provide (advantageously encoded) bandwidth extension parameters which can be used, at the side of an audio decoder, for a parameter guided bandwidth extension (like, for example, a gap filling). Thus, the encoding may, for example, provide encoded spectral values (for example, in a low frequency range) like, for example, an encoded quantized MDCT spectrum. Furthermore, the encoding 420 may, for example, provide (advantageously encoded) bandwidth extension parameters which may, for example, describe an association between one or more source tiles and one or more target tiles and optionally also a whitening level. For example, the bandwidth extension parameters may take the form of an intelligent-gap filling (IGF) side information. However, the bandwidth extension parameters may also correspond to any other bandwidth extension concepts. Thus, both the encoded spectral values and the bandwidth extension parameters may be put into an encoded audio representation, which may take the form of a bitstream.

Moreover, the audio encoder 400 also comprises an encoding parameter determination 430, which may correspond to the encoding parameter determination 330. For example, the encoding parameter determination 430 may be used to determine one or more bandwidth extension parameters, like one or more parameters describing an association between one or more source tiles and one or more target tiles in the bandwidth extension and optionally also a parameter describing a whitening level.

Optionally, the encoding parameter determination 430 also comprises an association change restriction 480. The association change restriction 480 is configured to prevent changes of encoding parameters, in particular a change of an association between a source tile and a target tile, if such a change of the parameter would cause an audible distortion. For example, the association change restriction 480 may comprise a modulation strength determination 484 which may, for example, determine a strength 485 of a modulation in the envelope signals, wherein the modulation frequency considered by the modulation strength determination 484 may correspond to a frame rate of the input audio signal. Moreover, the association change restriction 480 may comprise a sensitivity measure determination 486 which determines a sensitivity information on the basis of the modulation strength information provided by the modulation strength determination 484. The sensitivity measure determined by the sensitivity measure determination 486 may, for example, describe by how much a hearing impression could be degraded by a change of an association between a source tile and a target tile. If the sensitivity measure provided by the sensitivity measure determination 486 indicates that a change of the association between a source tile and a target tile would have a strong (or significant, or noticeable) impact on the hearing impression, a change of the association between the source tile and the target tile is prevented by the association change gating 488. For example, the evaluation of the sensitivity measure may be performed using a threshold comparison 489, which compares the sensitivity measure 487 with a threshold value, to decide whether a change of the association should be allowed or prevented.

Accordingly, the encoding parameter information 424 is provided in the form of "restricted" encoding parameters, wherein a restriction is imposed by the association change restriction 480 on a change of the association between a source tile and a target tile.

To conclude, the optional association change restriction 480 can prevent a change of the encoding parameters at times when such change of the encoding parameters would lead to audible distortions. In particular, the association change restriction 480 can prevent a change of an association between a source tile and a target tile in a bandwidth extension if such a change of the association would result in a strong or significant or noticeable degradation of a hearing impression. The evaluation as to whether the degradation of the hearing impression would occur, is made on the basis of an evaluation of a modulation strength, as described above.

However, the audio encoder 400 can optionally be supplemented by any of the features, functionalities and details with respect to any of the other audio encoders, both individually and taken in combination.

5. AUDIO ENCODER ACCORDING TO FIG. 5

Figure 5A:
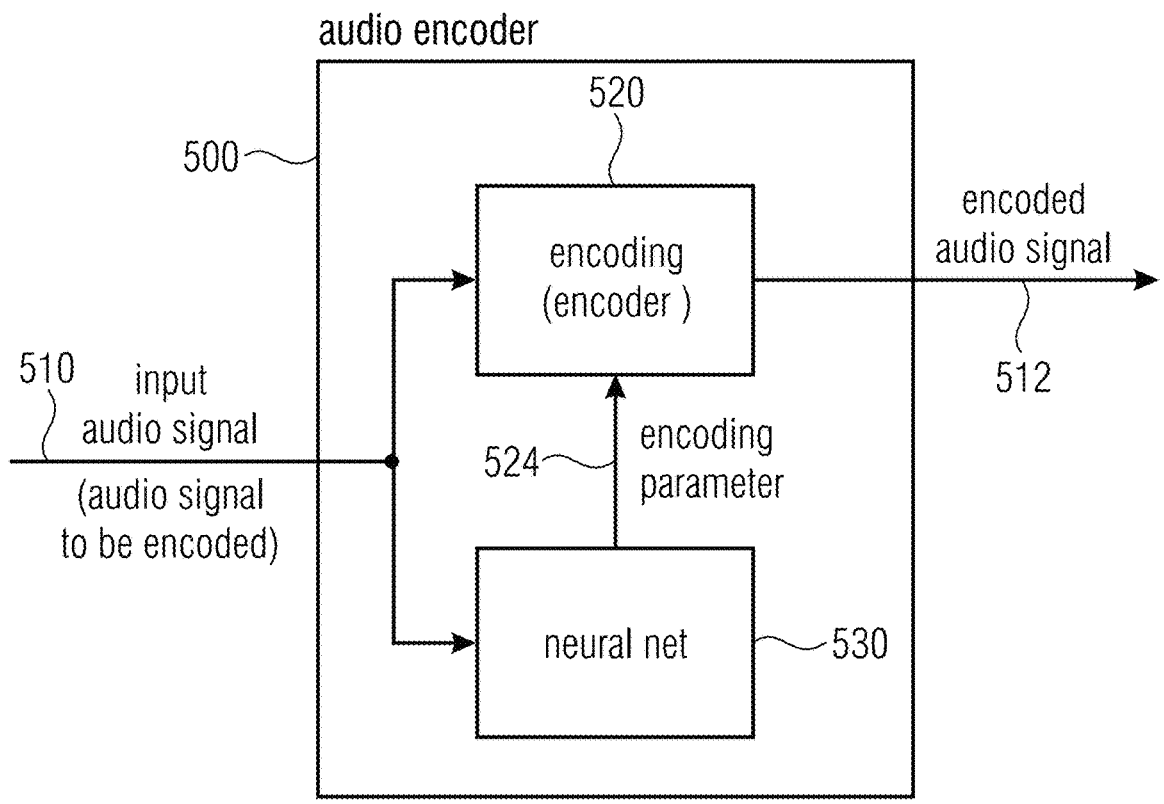
FIG. 5a shows a block schematic diagram of an audio encoder with a neural net in an operation mode, according to an embodiment of the present invention.

FIG. 5a shows a block schematic diagram of an audio encoder 500, according to an embodiment of the present invention.

The audio encoder 500 is configured to receive an input audio signal 510 and to provide, on the basis thereof, an encoded audio signal 512. The input audio signal 510 may, for example, correspond to the input audio signal 310, and the encoded audio signal 512 may, for example, substantially correspond to the encoded audio signal 312.

The audio encoder 500 also comprises an encoding 520 which may substantially correspond to the encoding 320 described above. The encoding 520 receives an encoding parameter information 524 from a neural net 530, which takes the place of the encoding parameter determination 330. The neural net 530 receives, for example, the input audio signal 510 and provides, on the basis thereof, the encoding parameter information 524.

It should be noted that the neural net 530 is trained using training data 532 which are provided using an audio similarity evaluator as disclosed herein or using an encoding parameter determination 330, 430 as disclosed herein. In other words, the encoding parameters, which are provided to the neural net 530 as a part of the training data 532, are obtained using audio similarity evaluator 100, 200 as described herein.

Accordingly, the neural net 530 typically provides encoding parameters 524, which are very similar to encoding parameters which would be obtained using an audio encoder 300 or an audio encoder 400, which actually makes the decision about the encoding parameters using such an audio similarity evaluator 100, 200. In other words, the neural net 530 is trained to approximate the functionality of the encoding parameter determination 330, 430, which is reached by using encoding parameters obtained using an audio similarity evaluator 100, 200 as a part of the training data for training the neural net 530.

Further details regarding the audio encoder 500 and generally regarding the usage of a neural net 530 in an audio encoder will be provided below.

Wording it yet differently, an encoding parameter determination 330 or an encoding parameter determination 430 could be used to provide training data for the neural net 530 to train the neural net to perform a functionality which is as similar as possible to the functionality of the encoding parameter determination 330, 430.

Figure 5B:
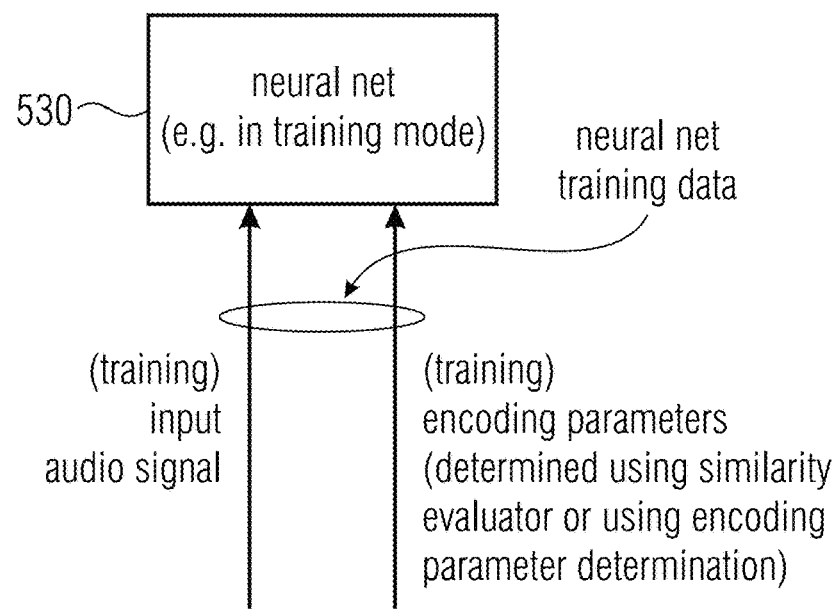
FIG. 5b shows a block schematic diagram of a neural net for use in an audio encoder in a training mode, according to an embodiment of the present invention.

A training of the neural net 530 in a training mode is shown in FIG. 5b. For the training, advantageously different training input audio signals and training encoding parameters associated with the different training input audio signals are provided to the neural net as training data. The training input audio signals serve as input signals to the neural net, and the training encoding parameters are desired output signals of the neural net. The (training) encoding parameters provided to the neural net as training data are typically obtained beforehand using an audio similarity evaluator, as discussed herein, or by an encoding parameter determination, as discussed herein (on the basis of the training input audio signals which are provided to the neural net during the training mode).

However, it should be noted that the audio encoder 500 may optionally be supplemented by any of the features, functionalities and the details described herein, both individually and taken in combination.

6. AUDIO SIMILARITY EVALUATOR ACCORDING TO FIG. 6

Figure 6:
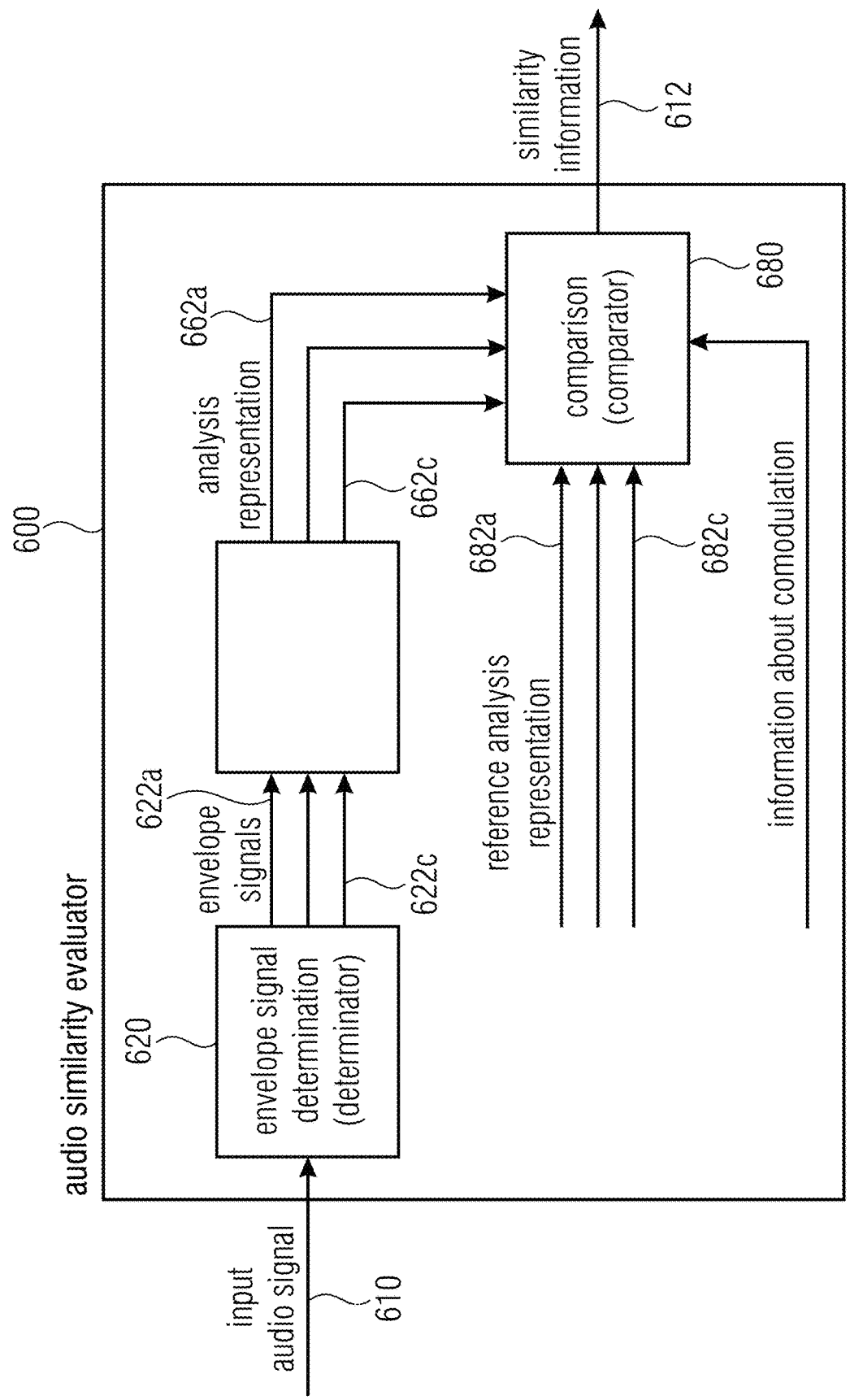
FIG. 6 shows a block schematic diagram of an audio similarity evaluator, according to an embodiment of the present invention.

FIG. 6 shows a block schematic diagram of an audio similarity evaluator 600, according to an embodiment of the present invention. The audio similarity evaluator 600 is configured to receive an input audio signal 610 and to provide, on the basis thereof, a similarity information 612.

The audio similarity evaluator 600 comprises an envelope signal determination 620, which is configured to obtain envelope signals 622a-622c for a plurality of (advantageously overlapping) frequency ranges on the basis of the input audio signal 610. For example, a filterbank or a gamma-tone filterbank may be used to provide the envelope signals 622a-622c. Optionally, a rectification and/or a temporal low-pass filtering and/or one or more adaptation processes (which may, for example, model a pre-masking and/or post-masking in an auditory system) may also be used to obtain the envelope signals 622a-622c.

Moreover, the audio similarity evaluator is configured to obtain an analysis representation 662a-662c. The analysis representation 662a-662c may, for example, correspond to the envelope signals 622a-622c or may, for example, be based on the envelope signal 622a-622c. The analysis representation 662a-662c may, for example, be an "internal representation", like a modulation information or a time-frequency-domain representation.

Moreover, the audio similarity evaluator 600 comprises a comparison (or a comparator) 680 and is therefore configured to compare the analysis representation 662a-662c of the input audio signal with a reference analysis representation 682a-682c which is associated with a reference audio signal. For example, the comparison 680 may comprise the formation of an internal difference representation, wherein the internal difference representation may, for example, describe a difference between the obtained analysis representation and the reference analysis representation. One or more weighting operations or modification operations may be applied when determining the internal difference representation, like a scaling of the internal difference representation based on a degree of comodulation and/or an asymmetrical weighting of positive and negative values of the internal difference representation. Accordingly, the similarity information (which may be considered as an information about the similarity between the input audio signal and the reference audio signal) may be obtained. The similarity information may, for example, take the form of a single value describing a perceptual similarity between the input audio signal and the reference audio signal.

The audio similarity evaluator is configured to adjust a weighting of a difference between the obtained analysis representation 662a-662c (for example, a modulation information or, generally, an "internal representation") and the reference analysis information 682a-682c (for example, a reference modulation information associated with a reference audio signal) in dependence on a comodulation (for example, between the obtained envelope signals 622a-622c or an obtained modulation information) in two or more adjacent acoustic frequency ranges of the input audio signal or in dependence on a comodulation (for example, between envelope signals associated with the reference signal or between a reference modulation information associated with the reference signal) in two or more acoustic frequency ranges of the reference audio signal. For example, an increased weight may be given to a difference in the case that a comparatively high degree of comodulation is found (for a frequency range under consideration) when compared to a case in which a comparatively low degree of comodulation is found (for the frequency range under consideration). The degree of comodulation may, for example, be found by determining a covariance between temporal envelopes associated with different acoustic frequency ranges (or by any other concept).

In other words, in the audio similarity evaluator 600, such components of a difference between the analysis representation 662a-662c (which typically comprises a plurality of values for a single frame of the input audio signal) and the reference analysis representation 682a-682c (which typically also comprises a plurality of individual values for a single frame of the input audio signal or of the reference audio signal) are emphasized (weighted relatively strongly) which are associated with frequency bands that have a comparatively high comodulation with other adjacent frequency bands.

Accordingly, in the comparison 680, differences between the analysis representation 662a-662c and the reference analysis representation 682a-682c are emphasized which occur in frequency bands which comprise a comparatively high comodulation (while differences are weighted lower if they are in frequency bands which comprise a comparatively smaller comodulation). It has been found that such an audio similarity evaluation brings along a similarity information 612 having a good reliability (and agreement with a perceptual impression).

However, it should be noted that the audio similarity evaluator 600 can optionally be supplemented by any of the features, functionalities and details described herein, both individually and taken in combination.

7. CONSIDERATIONS REGARDING THE EVALUATION OF AUDIO QUALITY AND AUDIO SIMILARITY

7.1 Dau's Model

A modelling approach that incorporates specific assumptions about the perceptual processing of temporal envelope information present within critical bands was proposed by Dau et al. [9, 10]. Besides various processing steps that represent the effective signal processing of the peripheral auditory system (cf. [11]) this model assumes that the temporal envelope shape seen within each critical band is processed by a bank of modulation filters. This bank of modulation filters represents the spectral resolution of the auditory system in the modulation domain (cf. [12]).

It has been found that Dau's model, or a model derived from (or based on) Dau's model, can be used with good performance for the evaluation of audio similarity (for example, in the audio similarity evaluators and audio encoders disclosed herein).

7.2 Model Benefit for Controlling BWE

According to an aspect of the invention, using such a modeling approach may be beneficial for parametric signal representations such as BWE. More specifically, it has been found that for pitched signals that often occur in music, replicating a low-frequency portion of a tone complex at higher frequencies will create a periodic envelope structure that can resemble the envelope structure of the original signal quite well, even when the parametrically represented waveform itself differs substantially from that of the original signal.

According to an aspect of the invention, a perceptual model that can evaluate the perceived similarity of this temporal envelope information can help to steer encoding decisions that affect the temporal envelope such as noise and tonality adjustment in BWE and similar techniques.

Accordingly, embodiments according to the invention use Dau's model, or a model derived therefrom, for the evaluation of audio similarity and for the decision which encoding parameters should be used.

8. PROPOSED PSYCHOACOUSTIC MODEL

8.1 General Considerations

Figure 7:
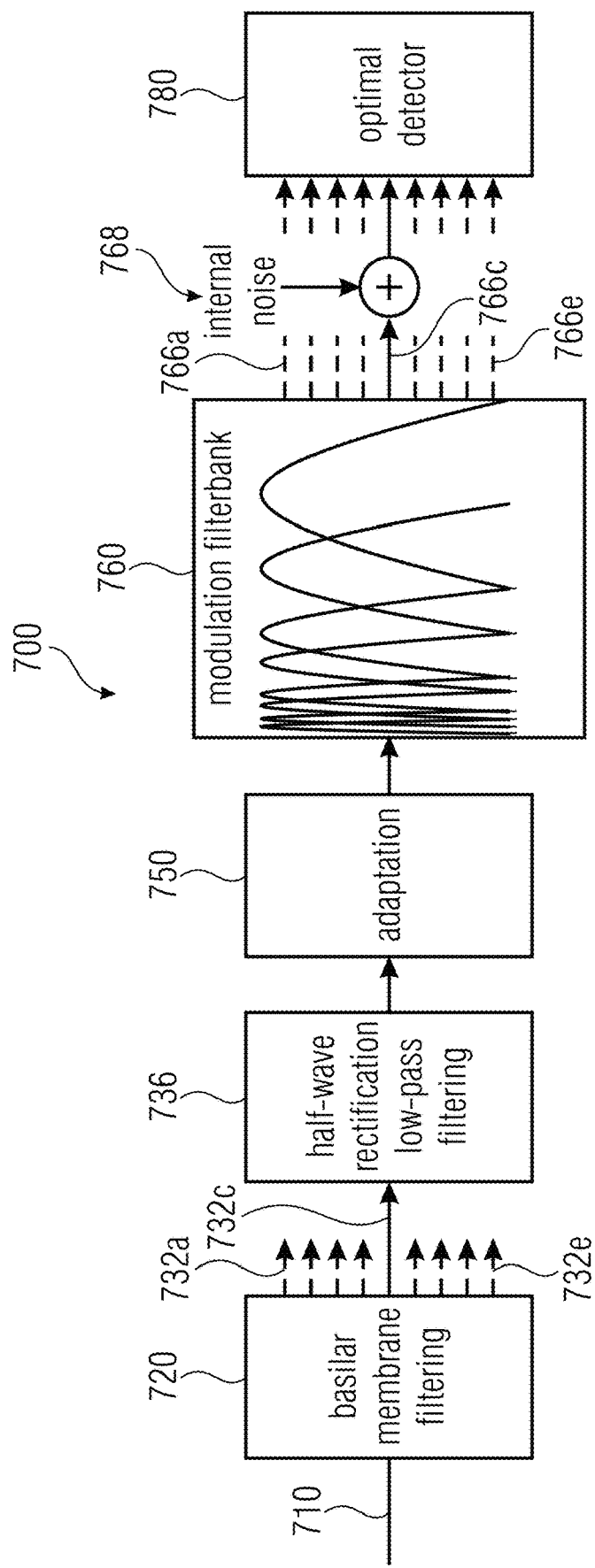
FIG. 7 shows a schematic representation of a signal flow and of processing blocks of a Dau et al, auditory processing model.

In this section a model will be presented for which the first processing stages mostly resemble the Dau et al. [9] model as depicted in FIG. 7. In the later processing stages, the model is optionally extended to include some additional perceptual phenomena and to make the model suitable both for encoding decisions that have perceptual consequences on a local and a more global temporal scale. In line with the original model of Dau et al. [9] an input to the model is converted into a so-called Internal Representation (IR). This IR is a transformation of the input signal into a perceptual domain which contains all information available for further auditory processing. Due to added internal noise onto the IR, small changes in the IR due to changes in the input signal will not be detectable. This process models the perceptual detectability of changes in the input signal.

FIG. 7 shows an schematic diagram of a signal flow and of processing blocks of the Dau et al, auditory processing model. The model 700 comprises a basilar membrane filtering 720, which may, for example, apply a basilar membrane filtering to an input audio signal 710. The basilar membrane filtering 720 provides, for example, a plurality of bandpass signals which cover different (possibly overlapping) frequency ranges of the input audio signals 710. The output signals 732a-732e of the basilar membrane filtering 720 may, for example, correspond to the signals 232a-232e provided by the filtering 230.

The model 700 also comprises a plurality of parallel signal paths, which operate on the different output signals 732a-732e of the basilar membrane filtering 720. For the sake of simplicity, only one single processing path is shown, which comprises a half-wave rectification and low-pass filtering 736 which may, for example, correspond to the rectification 236 and to the low-pass filtering 240 of the envelope signal determination 220. Moreover, the model also comprises an adaptation 750 which may, for example, correspond to the adaptation 250. Accordingly, at the output of the adaptation, which receives a result of the half-wave rectification and low-pass filtering 736 (which is applied to the respective output signal 732c of the basilar membrane filtering 720) an envelope signal 722c is provided, which may correspond to the envelope signal 222c. Moreover, the model 700 also comprises a modulation filterbank 760, which is associated with a frequency range of the basilar membrane filtering 720 (for example, with one output signal 732c of the basilar membrane filtering 720). In other words, there may be a plurality of (for example, separate) modulation filterbanks associated with different frequency ranges of the basilar membrane filtering. The modulation filterbank 760 provides, at its output, modulation signals 766a-766e, which are associated with different modulation frequencies.

The model 700 optionally comprises a noise addition 768, which adds noise to the output signals of the modulation filterbank 760. The model 700 also comprises an "optimal detector" 780 which may, for example, correspond to the comparison 280.

In other words, the components of the model 700 may, for example, be used in the audio similarity evaluators disclosed herein. Accordingly, the features, functionalities and details described in the following with respect to individual components of the model 700 can optionally be implemented individually and in combination into the audio similarity evaluators and audio encoders disclosed herein.

8.2 Gammatone Filterbank (Details are Optional)

Figure 8:
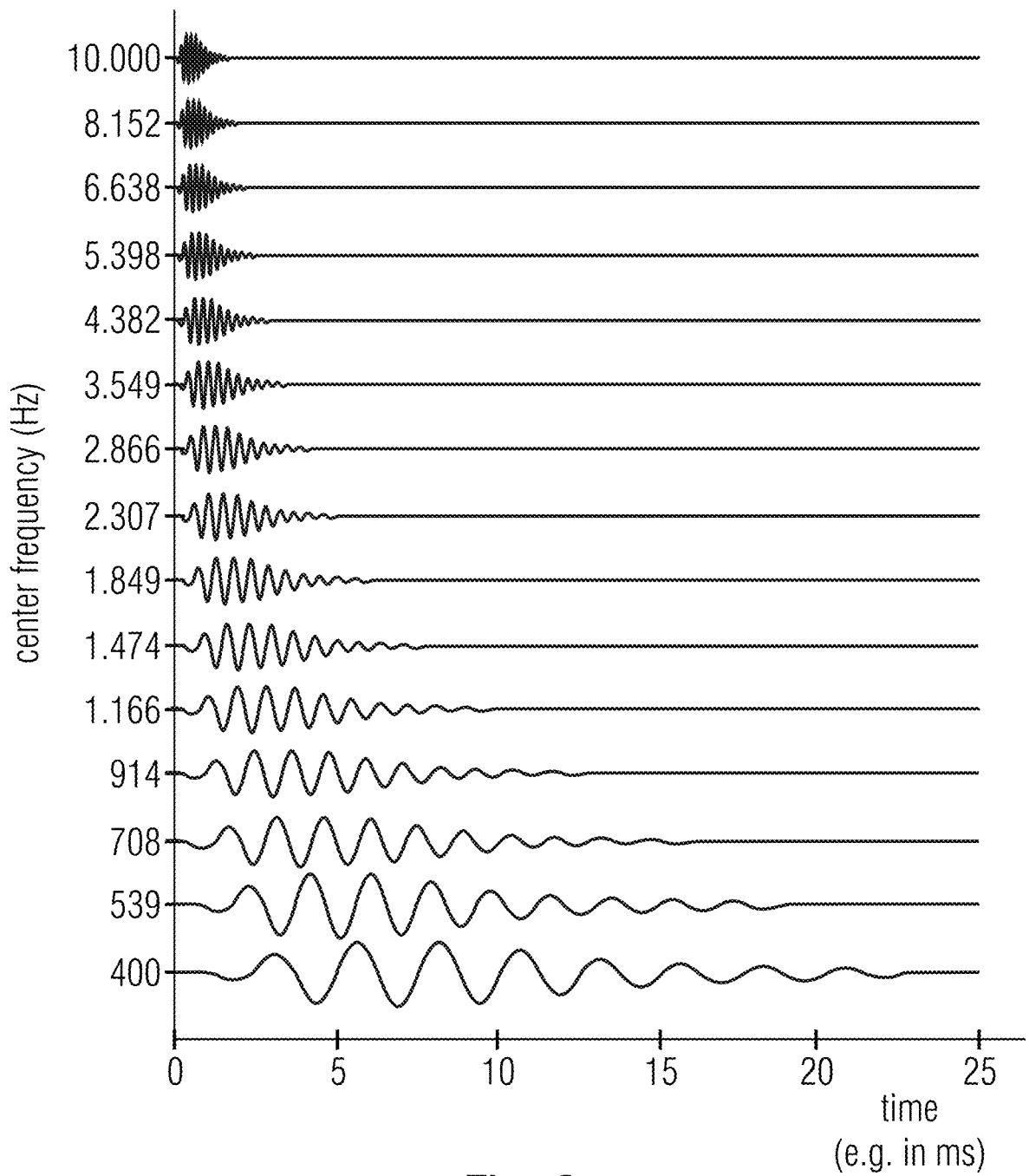
FIG. 8 shows a schematic representation of gamma-tone filterbank impulse responses.

The proposed model, which may, for example, be used in the envelope signal determinators 120, 220, or in the filtering 230, starts with processing the input signal 110, 210, 710 with a 4-th order gamma-tone filterbank consisting, for example, of 42 filters spaced uniformly on a perceptual scale across the frequency range spanning, for example, 150 Hz until 16 kHz. This stage represents the spectral signal analysis within the auditory cochlea. An obvious trait in the basilar membrane impulse responses is that the high-frequency impulse responses are much shorter than the low-frequency ones such as can be seen in FIG. 8, which shows a schematic representation of Gamma-tone filter bank impulse responses. The length of the temporal analysis window that is used to achieve a frequency resolution of about 12% of the centre frequency in line with common estimates of auditory filter bandwidth (cf. [13]) can be achieved with proportionally shorter time windows as the centre frequency increases. This explains why the impulse responses of basal, high-frequency parts of the basilar membrane are shorter than those of the apical, low-frequency parts. A frequency resolution of 12% of the centre frequency does of course mean that, in absolute terms, the high frequency region of the basilar membrane achieves only a poor spectral resolution, but a high-temporal resolution, while for the low-frequency region the reverse is true.

8.3 Inner Hair Cells (Details are Optional)

Each gamma-tone filter output is processed by a simple model of the inner hair cells, which, for example, consists of a half-wave rectification followed by a low-pass filter with a cut-off frequency at 1000 Hz (for example shown at reference numeral 736). The output of this inner hair cell model represents the rate of action potentials on fibres of the auditory nerve which is assumed here to have a limited temporal resolution.

Figure 9:
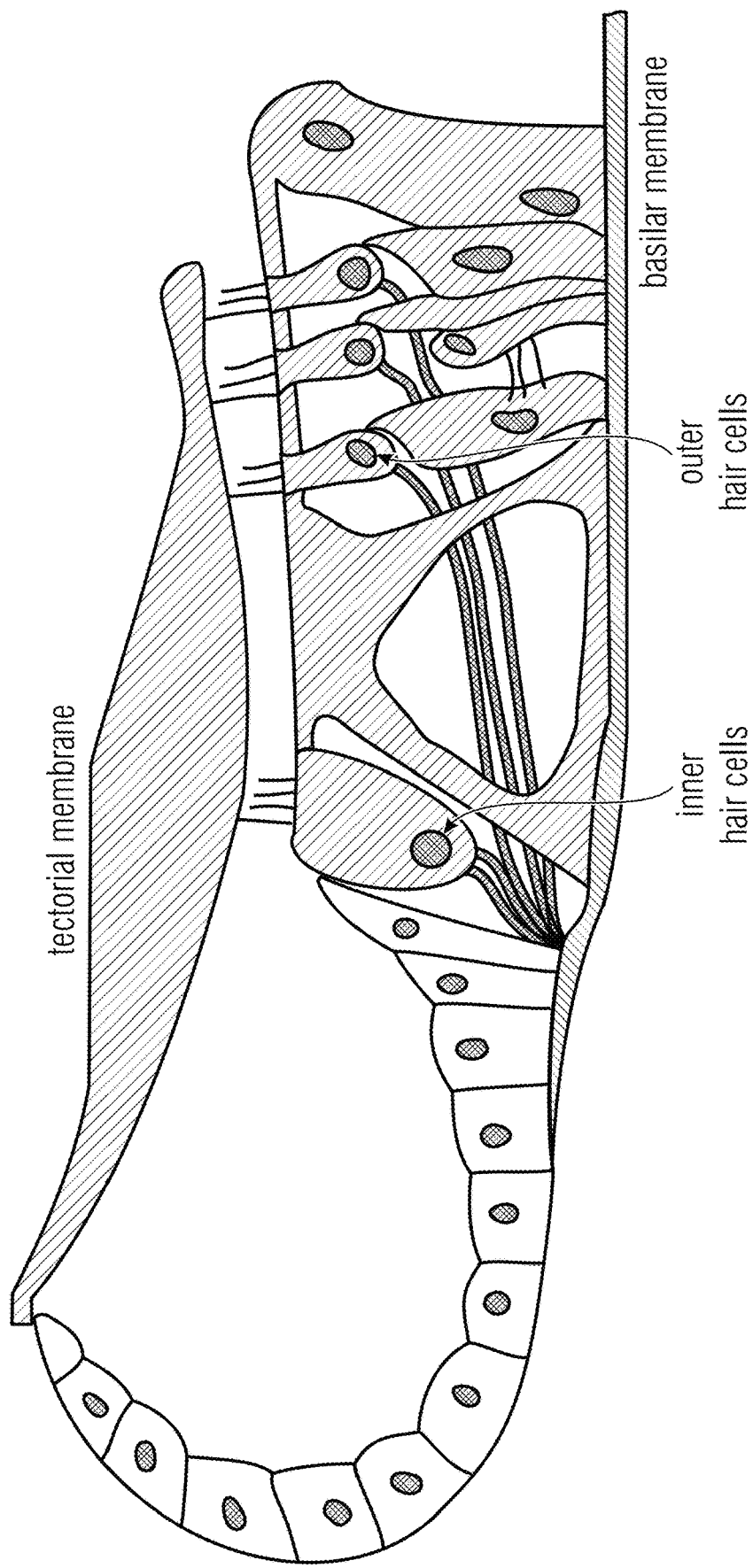
FIG. 9 shows a schematic representation of an Organ of Corti (modified from [14])

The half-wave rectification in the simple hair cell model is related to the fact that the stereocilia ('hairs') only open their ion canals when pushed to one side which results in changes of the potential in the cell (see FIG. 9 which shows a schematic representation of an Organ of Corti). The rate of change of the resulting potential is limited. Thus, the firing rate in the auditory nerve can be synchronised to the fine structure of the basilar membrane movement only for relatively low frequencies. This general behaviour is implemented by the low-pass filter (which is, for example also shown at reference numeral 736).

The functionalities of the inner hair cell model can, for example, be implemented in the blocks 236, 240 of the envelope signal determination 220.

8.4 Adaptation Processes, Masking (Details are Optional)

After the inner hair cells processing a sequence of (for example) five adaptation loops follows (for example, included in the adaptation 750). They represent the adaptation processes taking place in the auditory system which manifest themselves in the phenomenon of forward masking (post masking) observed after the off-set of an audio signal. For example, each adaptation loop consists of (or comprises) an adaptive gain control that is attenuated by the low-pass filtered output of the same adaptation loop (i.e. a feedback loop). To understand the function of such an adaptation loop, consider the onset and offset of a signal. At the onset of the signal, the initial attenuation is small because there was no previous input/output, resulting in a large 'overshoot' output of the adaptation loop. The low-pass filtered output will raise and start to attenuate the output of the adaptation loop until an equilibrium is approached.

For input signals with a constant level, the steady state output of the, for example, five adaptation loops can, for example, be linearly scaled to be very similar to a decibel transformation in line with our perception of loudness. In this model, to avoid the considerable overshoot at the onset of a signal, a hard limit is applied to the output of the adaptation loops equal to the decibel transformed input signal. At the off-set of a signal, the attenuation will persist for some time until the low-pass filter effect is diminished. This attenuation models the effect of forward masking; i.e. the reduced sensitivity to detect a target signal due to a preceding auditory 'masker' signal.

Such an adaptation may, for example, be provided by the adaptation 250.

8.5 Modulation Filterbank (Details are Optional)

The adaptation loops are, for example, followed by a modulation filterbank 760. It consists of a range of, for example, 5-Hz wide filters with centre frequencies, for example, from 0 Hz until 20 Hz, followed by filters, for example, with Q=4 separated by steps corresponding to the modulation filter bandwidth until a maximum centre frequency of, for example, 243 Hz is reached. Thus, the spectral resolution in the modulation domain is higher in this model than in [9] and the highest modulation frequency is limited to be more in line with the maximum modulation frequencies that can be processed by humans (cf. [15]). The filter outputs are, for example, complex valued, only representing positive frequencies.

A further modification is (optionally) made to the modulation filters. With a Q-factor of only 4, each modulation filter can be expected to attenuate the DC component of the envelope only to a limited degree. Given that the DC components in the envelope has a high amplitude relative to the modulated components, the DC component can play a dominant role in the output of modulation filters, even when they are tuned to high centre frequencies.

To remove the DC component, the output of each modulation filter is, for example, low-pass filtered with a cut-off frequency of half the modulation filters centre frequency. Then the absolute values of the modulation filterbank output and the low-pass filter are, for example, subtracted from one another. In this way the DC component is removed as well as the modulation phase information which is here assumed to not be processed directly by the auditory system. Such a functionality may, for example, be performed by the DC removal 270.

The implication of the processing of phase information of the temporal envelope would be that the exact timing of auditory events would be perceptible. A study by Vafin et al. [16] showed that listeners are insensitive to small shift in timing of onsets. The DC removal is especially relevant in an encoder control stage that is described herein (for example, later on (Sec. 9.3)). This stage optionally uses (or should advantageously have) the strength of modulations without DC components as an input to make decisions on whether switching from one to another encoding option is allowed.

The functionality of the modulation filterbank can, for example, be performed by the filtering 264. The functionality can, for example, be supplemented by the DC removal 270 and by the phase information removal 274.

8.6 Internal Representation (IR) (Details are Optional)

The resulting outputs of all modulation filters across all auditory filters constitutes, for example, the Internal Representation (IR). In principle the IRs of the original and encoded signal can be compared; for example, the sum of all squared differences across the complete IR provides a metric for the audibility of the differences between the original and encoded signal (cf. [17]). For example, such a comparison may be performed by the comparison block 280 (for example, using the combination/evaluation 298).

To include some aspects of further stages of auditory processing, three modifications are (optionally) made to the differences between both IRs (to be termed Internal Difference Representation (IDR)).

The resulting IDR can be used to make decisions about encoding options that are available (or, worded differently, decisions about the encoding parameters). Each encoding option entails a specific choice of parameters with which the encoding is done. The IDR does provide a metric that predicts the level of perceptual distortion created by the corresponding encoding option. The encoding option that leads to the minimum predicted perceptual distortion is then selected (for example, using an encoding parameter selection 370).

8.7 Comodulation Masking Release (CMR) (Details are Optional)

The first (optional) modification of the IDR is related to comodulation of spectral bands. It has been found that for maskers that are temporally comodulated across frequency bands, added tones can be detected at much lower levels (cf. [18]) than for temporally uncorrelated maskers. This effect is called Comodulation Masking Release (CMR). Also at high frequencies comodulation of frequency bands lead to less masking [19].

This led us to infer that for comodulated signals, also differences in the IRs between the original and encoded signal would be detected more easily (for example, by a human listener).

To account for this effect, the IDR is optionally scaled up based on the degree of comodulation (for example, in the weighting 292a to 292e).

The degree of comodulation is determined, for example, by measuring the degree of covariance between the temporal envelopes of the auditory filter under consideration with the four adjacent auditory filters (two below and two above the filter considered). For example, the output of the adaptation loops, followed by an optional low-pass filter (with a time constant of 0.01 sec) was used to represent the temporal envelopes of the auditory filter outputs.

This determination of the degree of comodulation may, for example, be performed by the comodulation determinator 299a.

In preliminary comparisons of model predictions with subjective ratings, better predictions were obtained through inclusion of CMR effects into the model. Still, as far as we are aware, CMR has not been taken into account in the context of perceptual audio coding so far.

8.8 Temporal Smoothing (Details are Optional)

Secondly, the internal representation is (optionally) temporally smoothed across a duration of about 100 ms. This temporal smoothing may, for example, be performed by the temporal smoothing 290a to 290e.

The motivation for this is that human listeners, although they can well perceive the presence of temporal fluctuations in noise they are relatively insensitive to the details of these stochastic fluctuation. In other words, only the modulation strength as such is perceived, not so much the temporal details of the modulation. The work of Hanna [20] showed that specifically longer noise tokens generated by the same noise generator cannot be distinguished from one another.

8.9 Perceptual Asymmetry (Details are Optional)

Thirdly, it was optionally considered that signal components that are added when encoding a signal lead to a more detrimental effect in terms of audio quality than components that are removed. The underlying assumption is that components that are added will often not share common properties with the original audio signal and for that reason will be more noticeable as artefacts.

This was (optionally) implemented by an asymmetrical weighting of positive and negative values of the difference in the IRs. The asymmetrical weighting may, for example be performed by the weighting 292a to 292e.

In preliminary comparisons of model predictions with subjective data, the asymmetric weighting was found to lead to better predictions.

9. IGF CONTROL BY PSYCHOACOUSTIC MODEL

In the following, it will be described how a bandwidth extension (for example, an Intelligent Gap Filling, IGF) (or parameters of the bandwidth extension) can be controlled using the Audio similarity evaluator discussed herein (for example, in an audio encoder as discussed herein).

9.1 IGF Tool (Details are Optional)

Intelligent Gap Filling (IGF) [5] is a semi-parametric audio coding technique introduced first to the standardisation process of MPEG-H 3D Audio in 2013 [21][6], that fills spectral gaps in a decoded audio signal with estimates of the missing signal guided by compact side information. As such, the application of IGF is non-waveform preserving. IGF can also act as a traditional BWE and may be configured to fill an entire empty high frequency region with an estimated signal, but can also be used beyond traditional BWE functionality to mix waveform-coded content with estimated content to fill remaining spectral gaps. That way, content known to be critical to traditional BWE, e.g. sweep signals can be coded faithfully.

Figure 10:
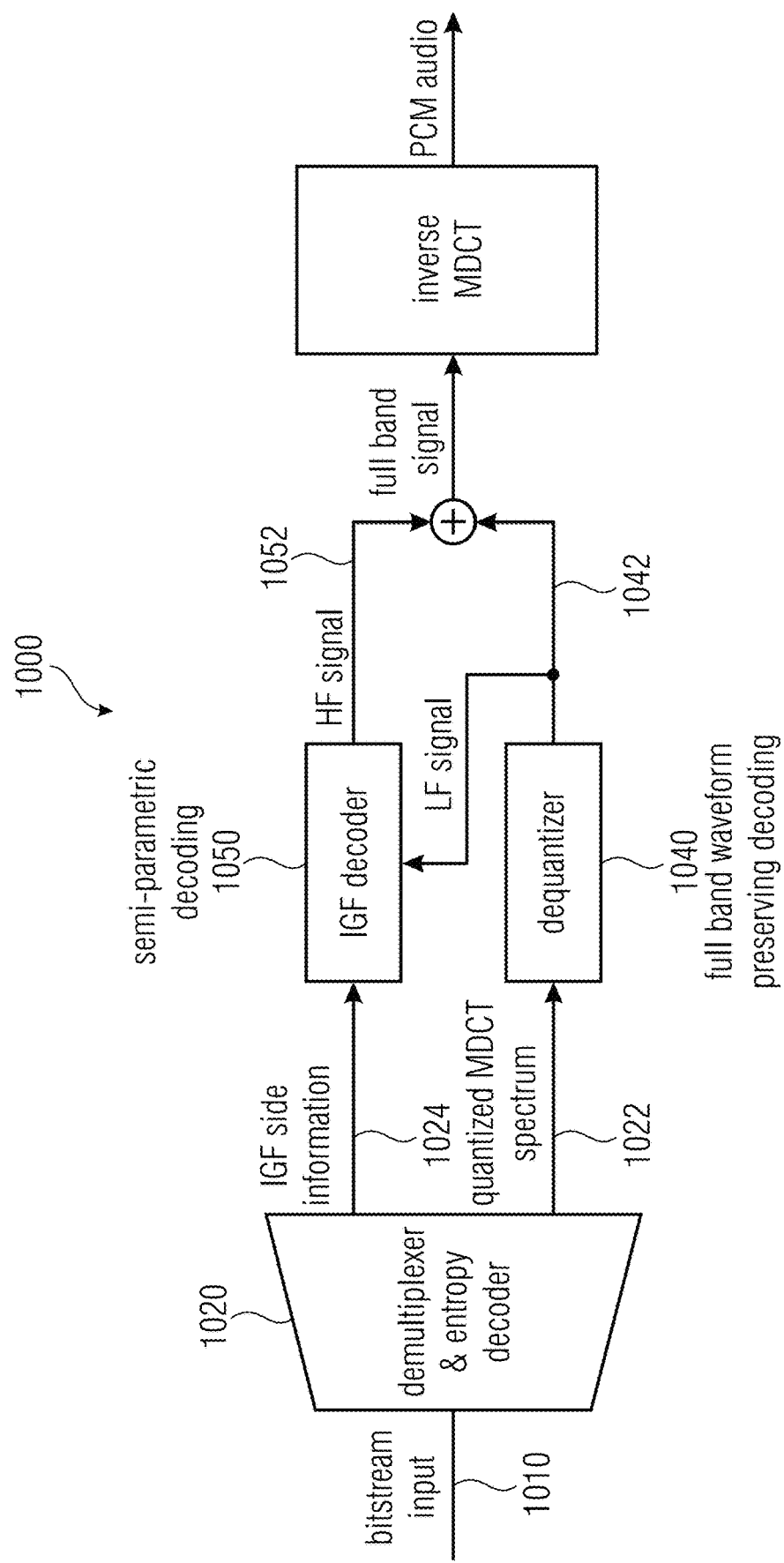
FIG. 10 shows a block schematic diagram of an audio decoder using IGF.

In FIG. 10, a decoder using IGF is depicted. After the dequantisation of the transmitted Modified Discrete Cosine Transform (MDCT) coefficients (for example, of the quantized MDCT spectrum 1022 extracted from an input bitstream 1010 using a demultiplexer and entropy decoder 1020) (for example, in the dequantiser 1040), these values (e.g. dequantized spectral values 1042) and the IGF side information 1024 (which may, for example, be derived from the input bitstream 1010 by the demultiplexer and entropy decoder 1020) are passed to the IGF decoder 1050. Using the side information 1024, the IGF decoder 1050 selects MDCT coefficients from the transmitted low band 1042 of the spectrum to assemble the high band estimate 1052. Therefore, the low and the high band is organised in so-called IGF source tiles and target tiles, respectively.

Figure 11:
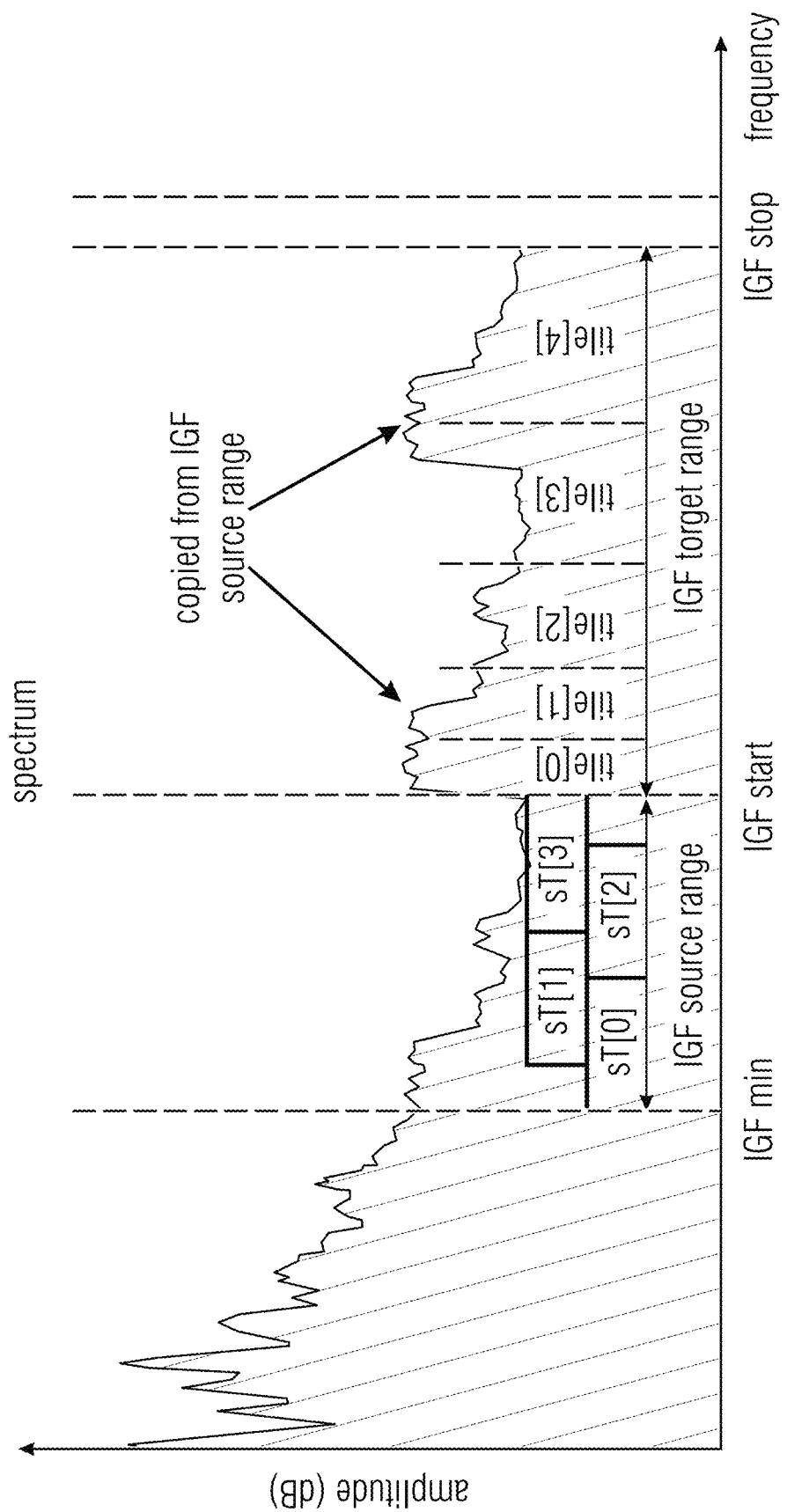

As depicted in FIG. 11, the IGF source range, which extends from the IGF min frequency in the lower part of the spectrum up to the IGF start frequency, is divided into four overlapping source tiles sT[i] (wherein, for example, I may take values from 0 to 3). The IGF target range, that is, the high frequency spectral bands to be reconstructed, is determined by the IGF start- and a stop frequency. Again, it is divided into a maximum of four consecutive target tiles (for example, designated with tile[0] to tile[4]) of increasing bandwidth towards higher frequencies.

During the IGF decoding process, the IGF range is reconstructed through copy-up of suitable source tiles into their target tiles and an adaption of tonal properties [22] and spectral envelope [23] to best match the original signal using the transmitted side information.

It should be noted that the decoding process described in this section may, for example, be controlled by a proper provision of encoding parameters by an audio encoder. For example, the encoding parameters may describe an association between the IGF source tiles (e.g. sT[0] to sT[3] and the IGF target tiles (e.g. tile[0] to tile[4]). These encoding parameters may, for example, determined in the audio encoders 300 and 400.

9.2 IGF Control

To be able to fill spectral gaps with perceptually best matching spectral content, IGF has many degrees of freedom to create such content. Basically, the signal to fill the high band (HF) is composed of time-frequency tiles (e.g. sT[0] to sT[3]) sourced from the low band (LF). Source and target spectral range (e.g. sT[0] to sT[3] and tile[0] to tile[4]) for the actual mapping can be chosen among many possibilities for each time frame individually.

To adapt tonality, IGF whitening [22] might be used to flatten the spectrum of a time-frequency tile taken from a tonal source region and to be inserted into a noisy target region. IGF offers three whitening levels: 'of', 'medium' and 'strong', 'strong' whitening consisting of a replacement of the tile's original content with random noise.

Taken just the flexible choice of tiles and the whitening options as combinations, results in a huge number of $n=(4^4)$ $(3^4)=20736$ individual combinations, where the $(4^4)$ are the possibilities of all different source tile selection and $(3^4)$ are all different whitening options, which are independently selectable for each tile. (In this example, it is assumed that there are 4 target tiles, which can separately be associated to 4 source tiles each, and which can separately be associated to one out of three whitening modes.)

We propose to employ our perceptual model as described above to make the perceptually closest choice out of these combinations to estimate the high band. In other words, the perceptual model described herein can, for example, be used in the audio encoders 300, 400 to select the parameters for the intelligent gap filling, for example parameters describing an association between source tiles and target tiles and parameters describing whitening modes.

For this, the IDR is, for example, used to derive the sum of squared difference (for example, in the comparison 180 or in the comparison 280) that serves as a metric for the audibility of the introduced perceptual distortions (For example, as a similarity information 112, 212, 342, 424). Note that this sum is optionally determined, for example, across a longer time interval exceeding a single encoding frame. This avoids frequent changes between selected encoding options.

The temporal smoothing within the model (see Subsection 8.8) effectively avoids a potential bias towards an overly tonal highband estimation.

However, encoding decisions being made with the above strategy are based on still essentially local decision criteria and therefore do not consider perceptual effects that might occur due to mere switching between two tiling options. To remedy this effect, we optionally introduced a criterion assuring stability where perceptually needed (which may be implemented, for example, in the association change restriction 380).

9.3 Stabilisation Criterion (Optional; Details are Also Optional)

As explained, IGF allows for many different alternative choices of IGF tiling to select spectral source and target ranges for high frequency insertion. When the precise shift of spectral frequency insertion varies over time on a frame-by-frame basis, it may occur that a single continuous tonal component is toggled between different high frequencies across time. This leads to very noticeable and annoying artefacts. It is assumed that these occur because the shift in frequency leads to modulations introduced in the encoded signal at modulation frequencies that correspond roughly to the frame rate of the encoder. To avoid this type of artefact, which comes into existence only across longer time scales, a limitation on the switching between IGF frequency shifts was optionally incorporated. This limitation of the switching between IGF frequency shifts (or, equivalently, between different associations between source tiles and target tiles of the bandwidth extension) is achieved, for example, by the association change restriction 480.

It was assumed that changing the IGF frequency shift (or the association between source tiles and target tiles) is only allowed provided that the original signal has (comparatively) strong modulation components in the range that corresponds to the modulations that would be introduced when there is a IGF frequency shift (for example, caused by a change of the association between a source tile and a target tile)(i.e. corresponding to the frame rate of the encoder). For that reason a sensitivity measure was optionally derived (for example, in the block 486) that predicts how sensitive a listener would be to introducing a frequency shift induced by a change of tiling. This sensitivity measure is, for example, simply inversely proportional to the modulation strength in the modulation filter corresponding to the frame rate of the encoder. Only when the sensitivity is below this fixed criterion, a change of the IGF tiling choice is allowable. This may, for example, be reached by the threshold comparison 489 and by the association change gating 480.

10 EXPERIMENT (SETUP AND DETAILS ARE OPTIONAL)

10.1 Outline

To assess the ability of the proposed psychoacoustic model to make a perceptually optimised parameter choice of parametric coding techniques, a Multi-Stimulus Test with Hidden Reference and Anchor (MUSHRA) [24] listening test was prepared. The listening test items were generated in an MPEG-H 3D Audio codec experimental offline environment engaging the semi-parametric IGF tool in two flavours as described in the following. A fixed tiling choice combined with a feature-driven whitening level estimation was compared with an automated choice of both parameters, stirred by the proposed psychoacoustic model.

10.2 Item Generation

For the listening test, every item was processed through a MPEG-H encoder/decoder offline chain. The bitrate was set to a very high value to exclude any influence of perceptual effects other than introduced by IGF. The MPEG-H 3D Audio encoder parameters were set up in a way, such that any suboptimal estimate for the IGF band would have a clearly audible impact. Therefore, IGF start-frequency was set as low as 4.2 kHz, the IGF stop-frequency to 8.0 kHz. Consequently, the original items were band-limited to 8.4 kHz to allow for a better comparison with the processed versions.

With this settings, IGF tiling is restricted to 3 target tiles only, thereby largely reducing the number of possible IGF parameter combinations to be evaluated down to a number that can be handled in terms of computational complexity in a practical experiment. To further reduce the number of combinations, equivalent combinations comprising at least one 'strong' whitening setting have been removed from the set, owing the fact that 'strong' whitening consists of a random noise replacement of the individual tile (see Subsection 3.2). Initially, there are $(2^3)(4^3)=512$ different IGF setting combinations without 'strong' whitening. If one, two or all three target tiles do employ strong whitening, this will result in additional $3(2^1)(4^1)+3(2^2)(4^2)+1=217$ combinations. Summing up, finally we have just 729 combinations left to consider (instead of the maximum number of combinations $n=(3^3)(4^3)=1728$ according to Subsection 9.2).

To generate the comparison condition, the codec was operated using a fixed tiling of '1313' (see Subsection 10.2), and the whitening was essentially controlled by evaluation of a spectral flatness measure (SFM). This directly corresponds to what is being employed e.g. in SBR, where no adaptive adjustment of the copy-up is supported, and also to current IGF encoder implementations, and therefore constitutes a fair comparison condition.

The automated choice was generated using a 'brute force approach' implemented in three consecutive processing steps as depicted in FIG. 6, which shows a schematic representation of a generation of IGF automated choice items:

In a first step, outputs (e.g. encoded and again decoded audio signals 1230 for all sets of parameters) for all available combinations of IGF tiling and IGF whitening were generated within a forced constant parameter mode (for example, on the basis of the input signal 1210 and using an audio encoder or MPEG-H encoder and an audio decoder or MPEG-H decoder 1224). Such, the encoder 1220 did not change the forced IGF tiling and IGF whitening parameters and kept them constant during encoding of one version. In this way, all possible IGF tiling and IGF whitening versions 1230 for the processed item were generated and stored in WAV format.

In a second step, the perceptual quality of each processed result obtained in the first step was estimated by analysing these wav-files through the psychoacoustic model 1240 (which may, for example, correspond to the audio similarity evaluator 100, 200 or comprise a similar or identical functionality when compared to the audio similarity evaluator 100, 200) on a frame-by-frame basis. All-in-all, quality estimations of n=729 different processing results (which may, for example, correspond to "similarity information" 112, 212 for different input audio signals) were compared (for example, by the decision block 1250) for obtaining the decision data 1252 and writing it to a text file.

Figure 13:
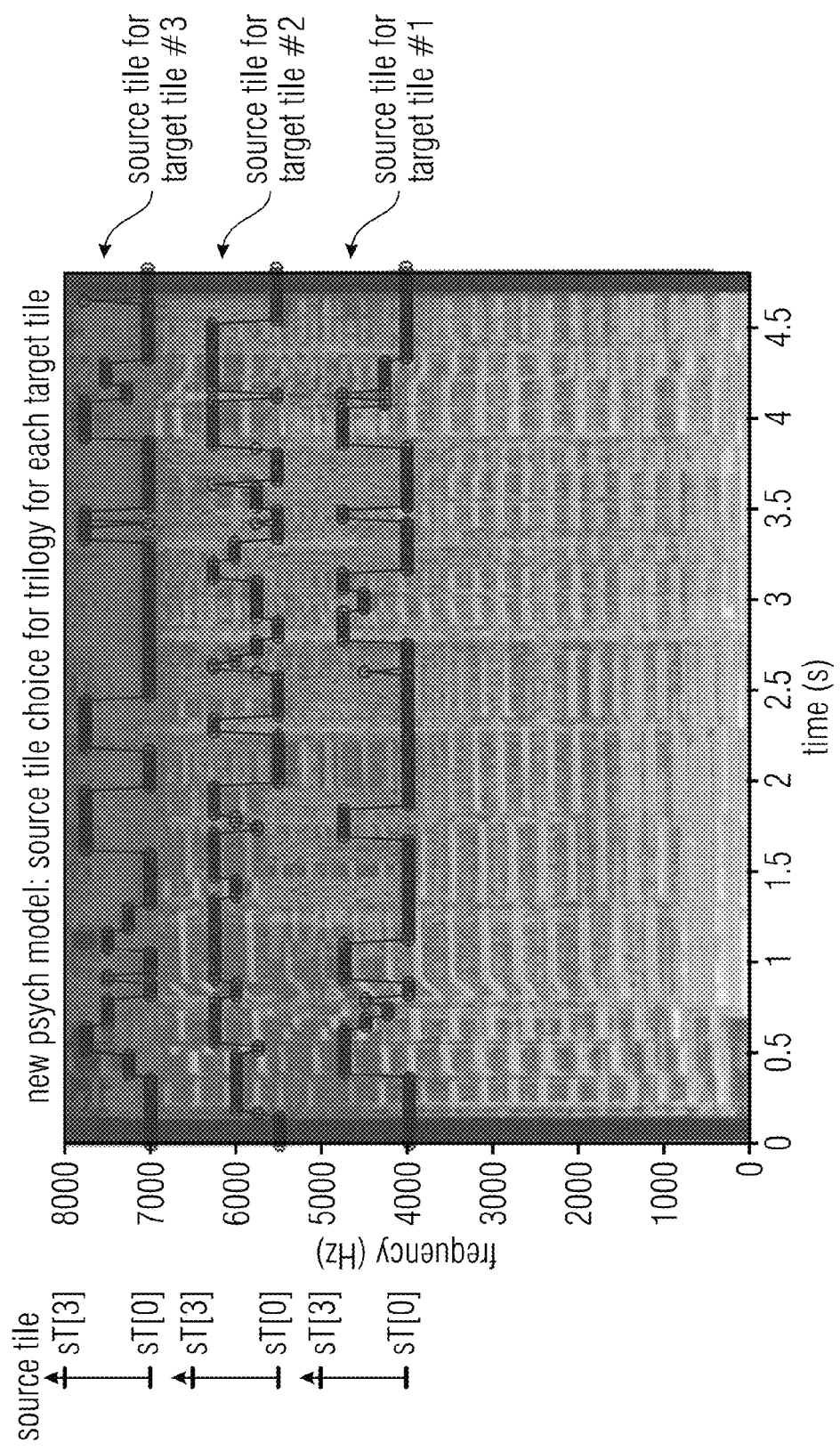
FIG. 13 shows a schematic representation of a choice of IGF tiles for the audio excerpt "trilogy" through automated control, wherein for each frame (circles), the source tile "sT" choice [0,1,2,3] is shown for each of the three target tiles as a black line overlaying on the spectrogram.
Figure 14:
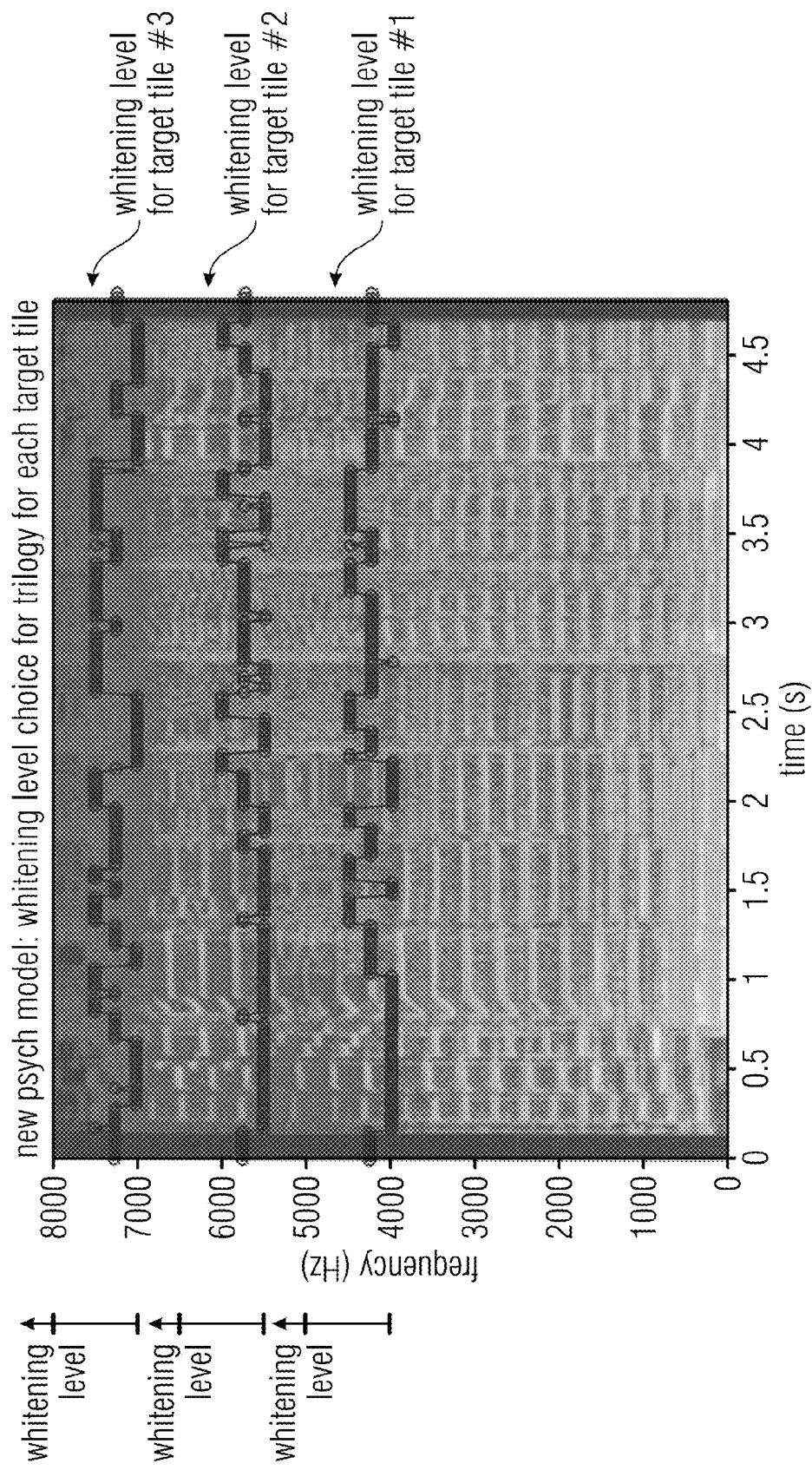
FIG. 14 shows a schematic representation of a choice of IGF whitening levels for the audio excerpt "trilogy" through automated control, wherein for each frame (circles), the whitening level choice [0,1,2] is shown for each of the three target tiles as a black line overlay on the spectrogram.

FIG. 13 and FIG. 14 display the decision data 1252 (which may, for example, correspond to selected encoding parameters 324, 424) obtained from the model for the item 'trilogy'. One can observe that a considerable amount of switching and thus dynamic adaptation is happening. Such decision data can, for example, be provided by the encoding parameter selection 370 or by the encoding parameter determination 430. Worded differently, FIG. 13 shows a temporal evolution which of the source tiles are associated to the three target tiles under consideration. FIG. 13 shows a temporal evolution which of the whitening modes (or whitening levels) are used for the three target tiles.

In a third processing step, the decision data (IGF-tiling choice and IGF-whiting parameters per frame), was fed from the text file into a MPEG-H encoder/decoder chain 1260, 1270 configured as detailed above, and used to make the dynamic selections at hand. The resulting WAV file finally yielded an encoded and decoded version 1272 featuring an automated choice through the proposed model.

The offline calculation setup together with the 'brute force approach' was chosen to demonstrate suitability of our proposed model in principle, and thus provide an upper quality bound using that model. In realistic applications, for example (optionally), a Deep Neural Network (DNN) (for example, the neural network 530) might learn and practically substitute the model output (for example, the similarity information 112, 212, 342, or the encoding parameter information 324, 424) at a fraction of its current computationally costs. In such a setup, the proposed model can automatically annotate a large amount of audio material for proper training (for example, to obtain the neural net training data 532).

To conclude, the functionality of blocks 1220, 1224, 1240, 1250, 1260 may, for example, be performed in the audio encoders 300, 400 (for example, by blocks 350, 360, 340, 370, 320, or by blocks 430, 420). Thus, the audio encoders may select the encoding parameters using the proposed model, which is implemented (fully or in part) in the audio similarity evaluators 100, 200, 340. However, the implementation of a audio encoder may be more efficient when using a neural net, as shown in the embodiment of FIG. 5, wherein the training data for the neural net are obtained using the proposed model (e.g. using the audio similarity evaluators described herein).

11. RESULTS

Figure 12:
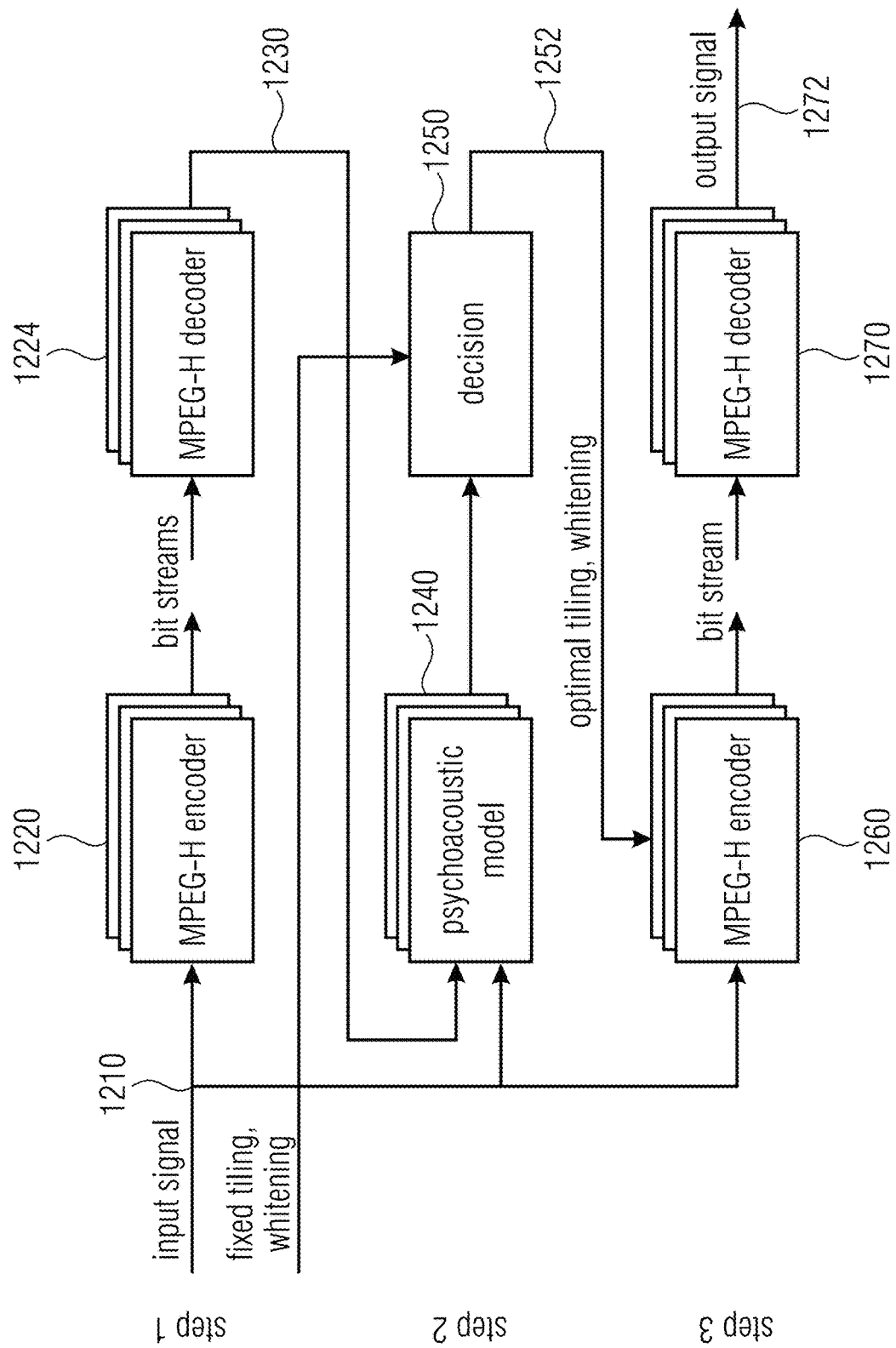
FIG. 12A shows Table 1 with items of a listening test.
FIG. 12B shows Table 2 with conditions of a listening test.

A set of 11 music excerpts shown in Table 1 (FIG. 12A) was prepared as the items for a MUSHRA listening test. The test altogether comprised 5 conditions listed in Table 2 (FIG. 12B). Listening was performed by 15 expert listeners in a living room like environment using electrostatic STAX headphones and amplifiers. In a MUSHRA test, all items under test are compared to an original. Note that since we used originals that have been band-limited to 8.4 kHz throughout (for reasons that have been explained in Subsection 10.2), these correspond to an absolute rating of 'excellent' on a scale ranging from 'excellent', 'good', 'fair', 'poor' to 'bad'.

Figure 15:
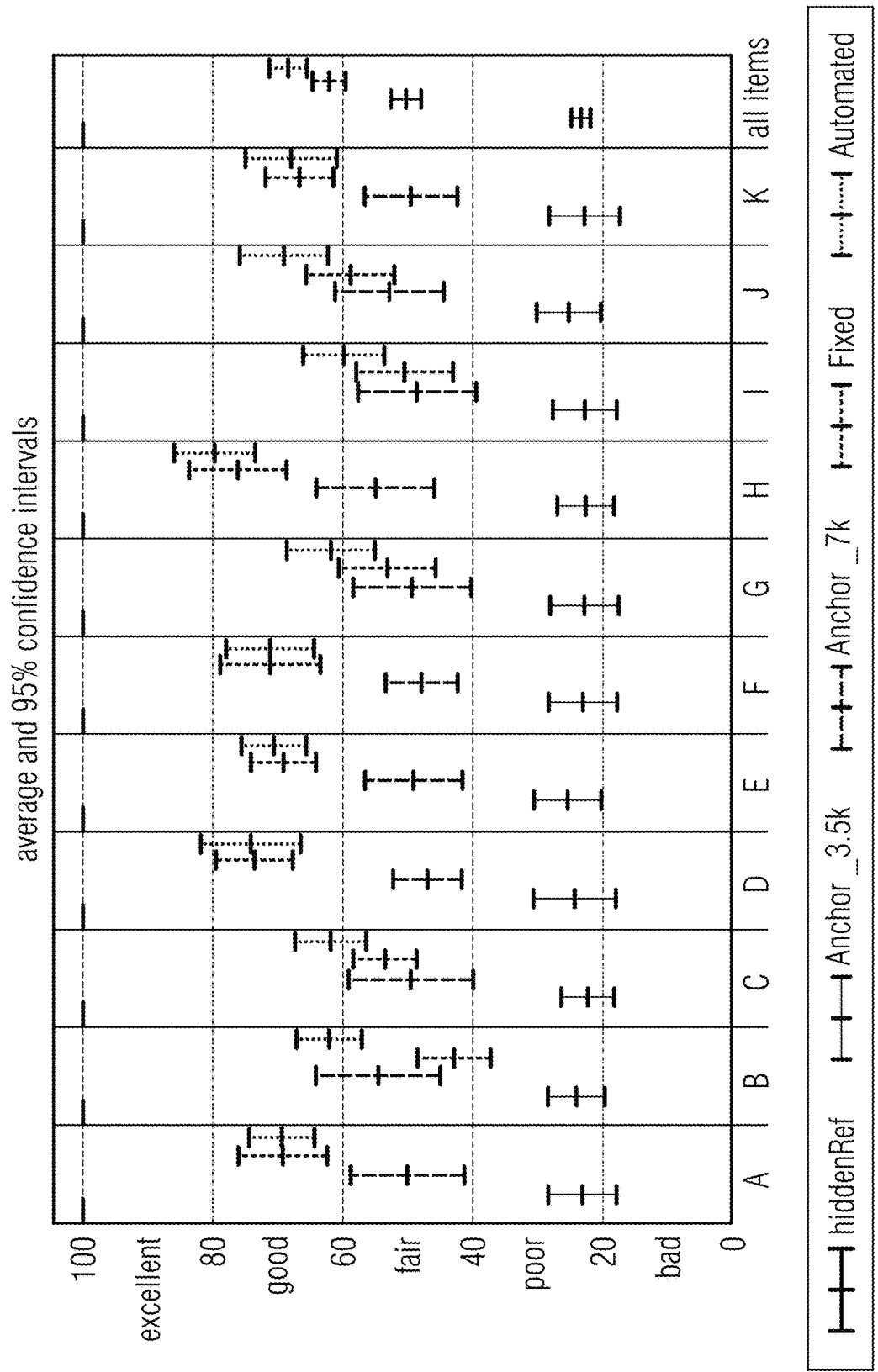
FIG. 15 shows a graphic representation of absolute MUSHRA scores of proposed automated and fixed IGF controls.

FIG. 15 displays the absolute scores of the listeners. The perceptual quality levels of the coded items were all rated in the range of 'fair' to 'good' as seen in the absolute scores. The automated condition's rating is 'good' throughout.

Figure 16:
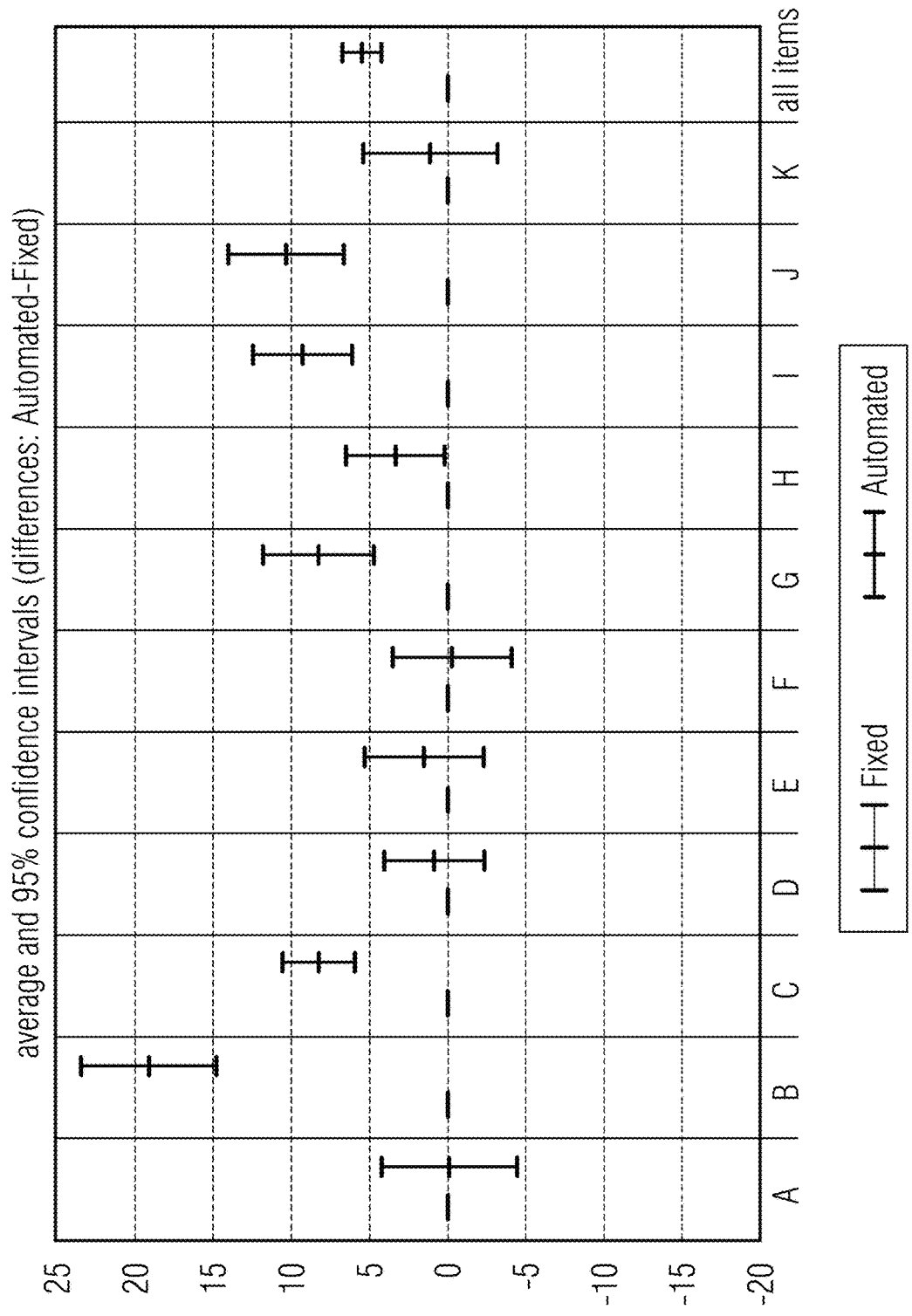
FIG. 16 shows a graphic representation of difference MUSHRA scores comparing proposed automated against fixed IGF control.

FIG. 16 shows the difference scores of the proposed automated condition and the fixed tiling baseline condition. From these difference scores it can be concluded that we see a significant average improvement of more than 5 MUSHRA points. Items 'B', 'C', 'G', 'H', 'I' and 'J' show significant individual improvements of 18, 7, 7, 3, 9 and 10 points, respectively. None of the individual items is degraded significantly.

12. DISCUSSION

The results of the listening test show a significant overall improvement of audio quality with the proposed encoding method. Two main conclusions can be drawn from this. Firstly, the results show that, for the semi-parametric IGF tool, switching between different encoder settings during encoding of a single excerpt on a frame-by-frame-basis can lead to an improvement of perceptual quality. Secondly, it was shown that for this purpose the newly proposed psychoacoustic model (and, accordingly, the proposed audio similarity evaluator 100, 200, 340) is able to control the encoding parameters of the parametric encoder (for example, of the encoding 320, 420) in an automated manner.

The adaptive encoding (Automated condition in the listening test) allowed to potentially switch between all available combinations of tiling selections (e.g. association between source tiles and target tiles) and whitening levels. In most excerpts this led to a reduction in the noise-like (coarse) character at high frequencies without introducing tonal artifacts.

Specifically, the psychoacoustic model was applied in a two-fold manner.

On one hand, it provided predictions about the perceptual degradation associated with the various encoding options available on a local time-scale. From this, the best 'local' encoding option could be selected.

Earlier experiments have shown, however, that directly applying this locally-based encoding optimum often leads to noticeable switching artefacts. Most specifically, when stable high-frequency tonal components are present, a switch to a different tiling option will lead to highly noticeable frequency modulation artefacts.

On the other hand, it optionally provided a stability criterion to avoid artefacts induced by untimely switching of encoding options (wherein such a stabilization mechanism may be implemented, for example, using the association change restriction). Consequently, the model (or the association change restriction 480) was used to determine at what moments within the audio signal it were possible to switch from one to another tiling. As a criterion for this, it was assumed that when the original audio excerpt exhibits highly tonal frequency regions, without much modulation, switching should be avoided.

In our current implementation it is determined which set of updated encoding parameters will lead to the locally best quality in case of a switching allowance (for example, in the encoding parameter determination). As the audio excerpt progresses, it may well happen that another specific set of best encoding parameters is to be selected, but switching to this set would be prohibited for a prolonged time (for example, by the association change restriction). If thereby the initial encoding parameters are to become very sub-optimal, the encoder nevertheless has to keep such a globally sub-optimal set for a longer time. An optional approach towards resolving this problem would be to (optionally) allow the psychoacoustic model to have a sufficient look-ahead in time, to take into account how present encoding decisions will affect the quality towards the future part of the excerpt.

While a decent overall improvement is seen for the Automated encoding method as compared to a Fixed encoding, a very large improvement was seen for individual items 'B', and also considerable improvements for items 'C', 'G', 'I', and 'J'. Here, in line with the general observations, the Automated version sounded much less noisy than the Fixed version supporting the general notion that the psychoacoustic model driven approach is able to choose a perceptually appropriate combination of tiling selection and whitening level.

13 SUMMARY

Although traditional auditory masking models have been shown to be very successful for controlling waveform preserving codecs, these models have been found to be unsuitable to likewise steer parametric coding tools.

In this document, according to an aspect of the invention, we propose to employ an improved, excitation based psychoacoustic model (which may be implemented, for example, in the audio similarity evaluator) to control the parametrisation (for example, the encoding parameters) of non-waveform preserving perceptual coding techniques (for example, of the encoding 320 or of the encoding 420). From this model, a so-called Internal Difference Representation (IDR) (for example, a difference representation 294a to 294e) is obtained for each of the available encoding options at hand. The IDR is shown to provide a metric that predicts the level of perceptual distortion created by applying the corresponding encoding option. For controlling the final encoding process, the encoding option that leads to the minimum predicted perceptual distortion is selected (for example, by the encoding parameter determination 330, 430, or by the encoding parameter selection 370).

We demonstrated that, in contrast to traditional perceptual models, the proposed excitation based approach can successfully steer the signal adaptive application of a parametric coding tool within a modern audio coder on the example of MPEG-H 3D Audio and its semi-parametric Intelligent Gap Filling (IGF) tool. With a MUSHRA listening test we have proven the goodness of our automated IGF parameter choice. On average, the 'automated parameter choice' condition significantly scored more than 5 MUSHRA points higher than a simple setting using a fixed IGF tiling scheme and tonality-based whitening.

The experiment described in this document is mainly theoretical to prove the principle applicability of such an advanced model to control the adaptive IGF parameter choice. We are aware that using the current 'brute-force approach' comes at the price of high computational complexity.

Therefore we envision, as an optional modification, to train a Deep Neural Network (DNN) on the model output and thus drastically cut complexity in a practical application of the proposed model.

14. OPTIONAL EXTENSIONS

In the following, Optional Extensions and Modifications for the "Improved Psychoacoustic Model for Efficient Perceptual Audio Codecs" will be described.

14.1 Introduction into the Extension

The main description of the invention presented above details the proposed psychoacoustic model and demonstrates advantageous embodiments using the proposed model as a controller for the estimation of IGF parameters within an MPEG-H 3D Audio Encoder.

The experimental setup sketches an experiment using an exhaustive approach ("brute force"), wherein, for example, all possible combination of parameters to be estimated are employed to generate a multitude of outputs which are subsequently compared to select the best one.

At the same time we mention that such an approach is computationally highly complex.

So we come to propose to use a Deep Neural Network (DNN) in practice to optionally replace the repeated application of the costly analytic calculus of the model itself.

14.2 DNN Approach

It should be noted, that the usage of the DNN approach is optional, usable as an alternative to the concepts mentioned above or in combination with the concepts mentioned above.

Such a DNN-based approach consists of training the DNN (for example, the neural net 530) with a sufficient lot of audio material that has been automatically annotated by the proposed psychoacoustic model's output (for example, using the audio similarity evaluator mentioned herein) (wherein the audio material annotated by the psychoacoustic model's output may be considered as the neural net training data 532).

Hence computational complexity is shifted into the (offline) preparation phase of the DNN training to produce the automatically annotated material (for example, as neural net training data 532), and also into the training phase (for example, of the neural net 530) to estimate the appropriate weights of the DNN nodes in the layers (for example, of the neural net 530).

In the application phase, the DNN (for example, the neural net 530), which may, for example, be used in an audio encoder to determine encoding parameters, has just moderate complexity owing its architecture.

For actual use, such an encoder (for example, the audio encoder 500) is equipped with a readily trained DNN (for example, trained using parameter information derived from training audio information using the audio similarity evaluator) that closely mimics the output of the described analytic psychoacoustic model (for example, the output of the audio similarity evaluator 100, 200, 340, or, for example, the output of the encoding parameter selection 330, 430).

14.3 Embodiments (Details are Optional)

In an implementation, said model output to be learned (for example by the DNN) can be a single number as a quality measure per audio frame (for example, obtained by the audio similarity evaluator), a single number's difference obtained through subtracting the quality measure of the original and a coded version thereof, or multiple numbers of an Internal Representation or their differences wrt. (with respect to) to those of the original.

In another implementation, a DNN is directly trained on the input signal (possibly using different representations as described below) and the decision data obtained from "step 2" in FIG. 6 (optimal tiling and whitening) using the described analytic psychoacoustic model (or using the audio similarity evaluator). Then, the DNN output can be directly used to control an encoder (e.g. MPEG-H encoder) to adapt the coding parameters in a perceptually optimal manner (wherein, for example, the encoding parameters are output by the neural net). Thus, there is no more need to encode the input signal with multiple different settings as used in the brute-force approach presented above.

DNNs can have different topologies (Convolutive Neural Networks (CNN), Recurrent Neural Networks (RNN), . . . ). DNN can be trained on different input (PCM data [frames], spectral data (Fourier Spectrum, Constant Q Transform, Gammatone Filterbank, . . . ).

15. ADDITIONAL COMMENTS AND REMARKS

It should be noted that the three IGF whitening levels (off=no processing, medium=attenuation of tonal peaks, strong=noise replacement) also comprise a noise replacement; in this case, the content of a tile is discarded and replaced by uncorrelated noise. These modes may, for example, be determined in the audio encoder. In other words, whitening level "strong" in IGF technically replaces the source tile by uncorrelated noise.

Moreover, in an embodiment, optionally, only certain (e.g. predetermined) spectral components of an audio signal are analyzed as described, for example, only a high band or high frequency band. This may, for example, be useful to reduce a complexity, for example, if only some parts of the spectrum are affected by encoding decisions. For example, this is useful in the described example using IGF, since no part of the spectrum outside a range between 4.2 kHz and 8.4 kHz is affected by the analysis results.

16. CONCLUSIONS

To conclude, since early perceptual audio coders such as mp3, the underlying psychoacoustic model that controls the encoding process has not undergone many dramatic changes. Meanwhile, modern audio coders have been equipped with semi-parametric or parametric coding tools such as audio bandwidth extension. It has been found that thereby, the initial psychoacoustic model used in a perceptual coder, just considering added quantisation noise, became partly unsuitable.

Generally speaking, embodiments according to the invention propose the use of an improved psychoacoustic excitation model based on an existing model devised by Dau et al. in 1997, for example, for an assessment of similarity of audio signals, for example in an audio encoder. This modulation based model is essentially independent from the precise input waveform by calculating an internal auditory representation. Using the example of MPEG-H 3D Audio and its semi-parametric Intelligent Gap Filling (IGF) tool, we demonstrate that we can successfully control the IGF parameter selection process to achieve overall improved perceptual quality.

However, it should be noted that the concept disclosed herein is not limited to the usage of any specific audio encoder or bandwidth extension concept.

17. FURTHER REMARKS

In the present document, different inventive embodiments and aspects will are described, for example, in chapters "Proposed Psychoacoustic Model" and "IGF Control by Psychoacoustic Model".

However, the features, functionalities and details described in any other chapters can also, optionally, be introduced into the embodiments according to the present invention.

Also, further embodiments will be defined by the enclosed claims.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an audio encoder (apparatus for providing an encoded representation of an input audio signal). Thus, any of the features described herein can be used in the context of an audio encoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

18. IMPLEMENTATION ALTERNATIVES

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Herre, J. and Disch, S., Perceptual Audio Coding, pp. 757-799, Academic press, Elsevier Ltd., 2013.
[2] Schuller, G. and Härmä, A., "Low delay audio compression using predictive coding," in 2002 IEEE International Conference on Acoustics, Speech, and Signal Processing, volume 2, pp. 1853-1856, 2002.
[3] Dietz. M., Liljeryd, L., Kjorling, K., and Kunz, O., "Spectral Band Replication, a Novel Approach in Audio Coding," in Audio Engineering Society Convention 112, 2002.
[4] Herre, J. and Dietz, M., "MPEG-4 high-efficiency AAC coding [Standards in a Nutshell]," Signal Processing Magazine, IEEE. (Vol. 25, 2008), pp. 137-142, 2008.
[5] Disch. S., Niedermeier, A., Helmrich, C. R., Neukam, C., Schmidt, K., Geiger, R., Lecomte, J., Ghido, F., Nagel, F., and Edler, B., "Intelligent Gap Filling in Perceptual Transform Coding of Audio," in Audio Engineering Society Convention 141, 2016.
[6] ISO/IEC (MPEG-H) 23008-3, "High efficiency coding and media delivery in heterogeneous environments—Part 3: 3D audio," 2015.
[7] 3GPP, TS 26.445, EVS Codec Detailed Algorithmic Description; 3GPP Technical Specification (Release 12), 2014.
[8] Laitinen, M.-V., Disch, S., and Pulkki, V., "Sensitivity of Human Hearing to Changes in Phase Spectrum," J. Audio Eng. Soc (Journal of the AES), (Vol. 61, No. 11, 2013), pp. 860-877, 2013.
[9] Dau. T., Kollmeier, B., and Kohlrausch, A., "Modelling auditory processing of amplitude modulation. I. Detection and masking with narrow-band carriers," J. Acoust. Soc. Am., 102, pp. 2892-2905, 1997.
[10] Dau, T., Modeling auditory processing of amplitude modulation, Ph.D, thesis, 1996.
[11] Dau, T., Püschel, D., and Kohlrausch, A., "A quantization model of the 'effective' signal processing in the auditory system. I. Model structure," J. Acoust. Soc. Am., 99, pp. 3615-3622, 1996.
[12] Ewert, S., Verhey, J., and Dau, T., "Spectro-temporal processing in the envelope-frequency domain," J. Acoust. Soc. Am., (112), pp. 2921-2931, 2003.
[13] Glasberg, B. and Moore, B., "Derivation of auditory filter shapes from notched-noise data." Hearing Research, (47), pp. 103-138, 1990.
[14] https://commons.wikimedia.org/wiki/File:Cochlea crosssection.svg, July 2018.
[15] Kohlrausch, A., Fassel, R., and Dau, T., "The influence of carrier level and frequency on modulation and beat detection thresholds for sinusoidal carriers," J. Acoust. Soc. Am., 108, pp. 723-734, 2000.
[16] Vafin, R., Heusdens. R., van de Par, S., and Kleijn, W., "Improving modeling of audio signals by modifying transient locations," in Proceedings of the IEEE Workshop on Applications of Signal Processing to Audio and Acoustics, pp. 143-146, 2001.
[17] van de Par, S., Koppens, J., Oomen, W., and Kohlrausch, A., "A new perceptual model for audio coding based on spectro-temporal masking," in 124th AES Convention, 2008.
[18] Hall, J., Haggard, M., and Fernandes, M., "Detection in noise by spectro-temporal pattern analysis," J. Acoust. Soc. Am., (76), pp. 50-56, 1984.

[19] van de Par, S. and Kohlrausch, A., "Comparison of monaural (CMR) and binaural (BMLD) masking release." J. Acoust. Soc. Am., 103, pp. 1573-1579, 1998.

[20] Hanna, T., "Discrimination of reproducible noise as a function of bandwidth and duration," Percept. Psychophys., 36, pp. 409-416, 1984.

[21] Herre, J., Hilpert, J., Kuntz, A., and Plogsties, J., "MPEG-H Audio—The New Standard for UniversalSpatial/3D Audio Coding," 137th AES Convention, 2014.

[22] Schmidt, K. and Neukam, C., "Low complexity tonality control in the Intelligent Gap Filling tool." in 2016 IEEE International Conference on Acoustics. Speech and Signal Processing (ICASSP), pp. 644-648, 2016.

[23] Helmrich, C., Niedermeier, A., Disch, S., and Ghido, F., "Spectral Envelope Reconstruction via IGF for Audio Transform Coding," in IEEE International Conference on Acoustics. Speech and Signal Processing (ICASSP), Brisbane, Australia, 2015.

[24] ITU-R, Recommendation BS.1534-1 Method for subjective assessment of intermediate sound quality (MUSHRA), Geneva, 2003.

The invention claimed is:

1. An audio similarity evaluator,
wherein the audio similarity evaluator is configured to acquire envelope signals for a plurality of frequency ranges on the basis of an input audio signal, and
wherein the audio similarity evaluator is configured to acquire a modulation information associated with the envelope signals for a plurality of modulation frequency ranges, wherein the modulation information describes the temporal modulation of the envelope signals for the plurality of modulation frequency ranges and comprises a plurality of values which are associated with different modulation frequencies that are present in a respective envelope signal; and
wherein the audio similarity evaluator is configured to compare the acquired modulation information with a reference modulation information associated with a reference audio signal, in order to acquire an information about a similarity between the input audio signal and the reference audio signal.

2. The audio similarity evaluator according to claim 1, wherein the audio similarity evaluator is configured to apply a plurality of filters or filtering operations comprising overlapping filter characteristics, in order to acquire the envelope signals.

3. The audio similarity evaluator according to claim 2, wherein the audio similarity evaluator is configured to apply a rectification to output signals of the filters or filtering operation, to acquire a plurality of rectified signals, or wherein the audio similarity evaluator is configured to acquire a Hilbert envelope on the basis of output signals of the filters or filtering operation, or wherein the audio similarity evaluator is configured to demodulate the output signals of the filters or filtering operation.

4. The audio similarity evaluator according to claim 3, wherein the audio similarity evaluator is configured to apply a low-pass filter or a low-pass filtering to the rectified signals.

5. The audio similarity evaluator according to claim 1, wherein the audio similarity evaluator is configured to apply an automatic gain control, in order to acquire the envelope signals, or to apply a logarithmic transform, in order to acquire the envelope signals, or to apply a modeling of a forward masking, in order to acquire the envelope signals.

6. The audio similarity evaluator according to claim 5, wherein the audio similarity evaluator is configured to vary a gain applied to derive the envelope signals on the basis of rectified and low-pass filtered signals provided by a plurality of filters or filter operations on the basis of the input audio signal.

7. The audio similarity evaluator according to claim 1, wherein the audio similarity evaluator is configured to process rectified and low-pass filtered versions of signals provided by a plurality of filters or filtering operations on the basis of the input audio signal using a series of two or more adaptation loops, which apply a time-variant scaling in dependence on time variant gain values,
wherein the audio similarity evaluator is configured to adjust different of the time variant gain values using different time constants.

8. The audio similarity evaluator according to claim 1, wherein the audio similarity evaluator is configured to apply a plurality of modulation filters comprising different passbands to the envelope signals, to acquire the modulation information, and/or wherein the audio similarity evaluator is configured to apply a down-sampling to the envelope signals, to acquire the modulation information.

9. The audio similarity evaluator according to claim 8, wherein the modulation filters are configured to at least partially separate components of the envelope signals comprising different frequencies, wherein a center frequency of a first, lowest frequency modulation filter is smaller than 5 Hz, and wherein a center frequency of a highest frequency modulation filter is in a range between 200 Hz and 300 Hz.

10. The audio similarity evaluator according to claim 8, wherein the audio similarity evaluator is configured to remove DC components when acquiring the modulation information.

11. The audio similarity evaluator according to claim 8, wherein the audio similarity evaluator is configured to remove a phase information when acquiring the modulation information.

12. The audio similarity evaluator according to claim 1, wherein the audio similarity evaluator is configured to derive a scalar value representing a difference between the acquired modulation information and the reference modulation information associated with the reference audio signal.

13. The audio similarity evaluator according to claim 1, wherein the audio similarity evaluator is configured to determine a difference representation in order to compare the acquired modulation information with the reference modulation information associated with the reference audio signal.

14. The audio similarity evaluator according to claim 1, wherein audio similarity evaluator is configured to adjust a weighting of a difference between the acquired modulation information and the reference modulation information associated with the reference audio signal in dependence on a comodulation between the acquired envelope signals or modulation information in two or more adjacent acoustic frequency ranges or between envelope signals associated with the reference signal or between the reference modulation information in two or more adjacent acoustic frequency ranges.

15. The audio similarity evaluator according to claim 1, wherein the audio similarity evaluator is configured to put a higher weighting on differences between the acquired modulation information and the reference modulation information associated with the reference audio signal indicating that the input audio signal comprises an additional signal component when compared to differences between the acquired modulation information and the reference modulation information associated with the reference audio signal indicating that the input audio signal lacks a signal component when determining the information about the similarity between the input audio signal and the reference audio signal.

16. The audio similarity evaluator according to claim 1, wherein the audio similarity evaluator is configured to weight positive and negative values of a difference between the acquired modulation information and the reference modulation information using different weights when determining the information about the similarity between the input audio signal and the reference audio signal.

17. An audio encoder for encoding an audio signal,
wherein the audio encoder is configured to determine one or more coding parameters in dependence on an evaluation of a similarity between an audio signal to be encoded and an encoded audio signal,
wherein the audio encoder comprises an audio similarity evaluator according to claim 1, which is configured to evaluate the similarity between the audio signal to be encoded and the encoded audio signal.

18. The audio encoder according to claim 17, wherein the audio encoder is configured to encode one or more bandwidth extension parameters which define a processing rule to be used at the side of an audio decoder to derive a missing audio content on the basis of an audio content of a different frequency range encoded by the audio encoder; and/or
wherein the audio encoder is configured to encode one or more audio decoder configuration parameters which define a processing rule to be used at the side of an audio decoder.

19. The audio encoder according to claim 17, wherein the audio encoder is configured to support an Intelligent Gap Filling, and
wherein the audio encoder is configured to determine one or more parameters of the Intelligent Gap Filling using an evaluation of the similarity between the audio signal to be encoded and the encoded audio signal.

20. The audio encoder according to claim 17,
wherein the audio encoder is configured to select one or more associations between a source frequency range and a target frequency range for a bandwidth extension and/or one or more processing operation parameters for a bandwidth extension in dependence on the evaluation of a similarity between the audio signal to be encoded and the encoded audio signal.

21. The audio encoder according to claim 17,
wherein the audio encoder is configured to select one or more associations between a respective source frequency range and a respective target frequency range for a bandwidth extension,
wherein the audio encoder is configured to selectively allow or prohibit a change of an association between a source frequency range and a target frequency range in dependence on an evaluation of a modulation of an envelope in an old or a new target frequency range.

22. The audio encoder according to claim 21,
wherein the audio encoder is configured to determine a modulation strength of an envelope in a target frequency range in a modulation frequency range corresponding to a frame rate of the encoder and to determine a sensitivity measure in dependence on the determined modulation strength, and
wherein the audio encoder is configured to decide whether it is allowed or prohibited to change an association between a respective target frequency range and a respective source frequency range in dependence on the sensitivity measure.

23. An audio encoder for encoding an audio signal,
wherein the audio encoder is configured to determine one or more coding parameters in dependence on an audio signal to be encoded using a neural network,
wherein the neural network is trained using an audio similarity evaluator according to claim 1.

24. An audio similarity evaluator,
wherein the audio similarity evaluator is configured to acquire envelope signals for a plurality of frequency ranges on the basis of an input audio signal, and
wherein the audio similarity evaluator is configured to compare an analysis representation of the input audio signal, which corresponds to the envelope signals or which is based on the envelope signals, with a reference analysis representation associated with a reference audio signal, in order to acquire an information about a similarity between the input audio signal and the reference audio signal,
wherein audio similarity evaluator is configured to adjust a weighting of a difference between an acquired analysis representation and the reference analysis representation in dependence on a comodulation between the envelope signals in two or more adjacent acoustic frequency ranges of the input audio signal or between an acquired modulation information in two or more adjacent acoustic frequency ranges of the input audio signal or in dependence on a comodulation between envelope signals associated with the reference audio signal in two or more adjacent acoustic frequency ranges of the reference audio signal or between reference modulation information in two or more adjacent acoustic frequency ranges of the reference audio signal.

25. A method for evaluating a similarity between audio signals,
wherein the method comprises acquiring envelope signals for a plurality of frequency ranges on the basis of an input audio signal, and
wherein the method comprises acquiring a modulation information associated with the envelope signals for a plurality of modulation frequency ranges, wherein the modulation information describes the temporal modulation of the envelope signals for the plurality of modulation frequency ranges and comprises a plurality of values which are associated with different modulation frequencies that are present in a respective envelope signal; and
wherein the method comprises comparing the acquired modulation information with a reference modulation information associated with a reference audio signal, in order to acquire an information about a similarity between the input audio signal and the reference audio signal.

26. A method for encoding an audio signal,
wherein the method comprises determining one or more coding parameters in dependence on an evaluation of a similarity between an audio signal to be encoded and an encoded audio signal,
wherein the method comprises evaluating the similarity between the audio signal to be encoded and the encoded audio signal according to claim 25.

27. A method for encoding an audio signal,
wherein the method comprises determining one or more coding parameters in dependence on an audio signal to be encoded using a neural network, wherein the neural network is trained using a method for evaluating a similarity between audio signals according to claim 25.

28. A method for evaluating a similarity between audio signals,
- wherein the method comprises acquiring envelope signals for a plurality of frequency ranges on the basis of an input audio signal, and
- wherein the method comprises comparing an analysis representation of the input audio signal, which corresponds to the envelope signals or which is based on the envelope signals, with a reference analysis representation associated with a reference audio signal, in order to acquire an information about a similarity between the input audio signal and the reference audio signal,
- wherein the method comprises adjusting a weighting of a difference between an acquired analysis representation and the reference analysis representation in dependence on a comodulation between the envelope signals in two or more adjacent acoustic frequency ranges of the input audio signal or between an acquired modulation information in two or more adjacent acoustic frequency ranges of the input audio signal or in dependence on a comodulation between envelope signals associated with the reference audio signal in two or more adjacent acoustic frequency ranges of the reference audio signal or between reference modulation information in two or more adjacent acoustic frequency ranges of the reference audio signal.

29. A non-transitory digital storage medium having stored thereon a computer program for performing the method for evaluating a similarity between audio signals according to claim 25, when said computer program is run by a computer.

30. A non-transitory digital storage medium having stored thereon a computer program for performing the method for encoding an audio signal according to claim 26, when said computer program is run by a computer.

31. A non-transitory digital storage medium having stored thereon a computer program for performing the method for encoding an audio signal according to claim 27, when said computer program is run by a computer.

32. A non-transitory digital storage medium having stored thereon a computer program for performing the method for evaluating a similarity between audio signals according to claim 28, when said computer program is run by a computer.

\* \* \* \* \*